(12) United States Patent
Yabe et al.

(10) Patent No.: US 7,764,424 B2
(45) Date of Patent: Jul. 27, 2010

(54) LIGHT SOURCE APPARATUS AND MICROSCOPE APPARATUS

(75) Inventors: Masato Yabe, Hachioji (JP); Daisuke Yokoi, Tokorozawa (JP); Terumasa Morita, Hachioji (JP); Norio Maruyama, Hachioji (JP); Yukio Eda, Akiruno (JP)

(73) Assignee: Olympus Corporation, Tokyo (JP)

( * ) Notice: Subject to any disclaimer, the term of this patent is extended or adjusted under 35 U.S.C. 154(b) by 683 days.

(21) Appl. No.: 11/803,259

(22) Filed: May 14, 2007

(65) Prior Publication Data
US 2007/0274634 A1    Nov. 29, 2007

(30) Foreign Application Priority Data

| | | | |
|---|---|---|---|
| May 15, 2006 | (JP) | | 2006-135285 |
| May 15, 2006 | (JP) | | 2006-135286 |
| Mar. 23, 2007 | (JP) | | 2007-077836 |

(51) Int. Cl.
*G02B 21/06* (2006.01)
*F21V 7/00* (2006.01)
*F21V 9/00* (2006.01)

(52) U.S. Cl. ............. 359/385; 359/389; 359/390; 362/268; 362/293; 362/346; 362/575

(58) Field of Classification Search ............ 359/364, 359/368, 385, 389, 390, 888, 889; 362/231, 362/233, 235, 242, 268, 293, 294, 311.1, 362/326, 332, 346, 551, 572, 575

See application file for complete search history.

(56) References Cited

U.S. PATENT DOCUMENTS

| | | | | |
|---|---|---|---|---|
| 7,027,238 B2 * | 4/2006 | Weiss | | 359/385 |
| 7,236,298 B2 * | 6/2007 | Miyawaki et al. | | 359/385 |
| 7,262,909 B2 * | 8/2007 | Bosser et al. | | 362/293 |
| 7,268,940 B2 * | 9/2007 | Veith et al. | | 359/388 |
| 7,315,413 B2 * | 1/2008 | Miyawaki et al. | | 359/385 |
| 7,394,593 B2 * | 7/2008 | Rottermann et al. | | 359/388 |
| 2003/0184856 A1 * | 10/2003 | Otaki | | 359/383 |
| 2004/0114339 A1 * | 6/2004 | Obi | | 362/23 |
| 2008/0316571 A1 * | 12/2008 | MacAulay | | 359/239 |

FOREIGN PATENT DOCUMENTS

| | | |
|---|---|---|
| JP | 06-018406 | 1/1994 |
| JP | 8-512137 | 12/1996 |
| JP | 10-206610 | 8/1998 |
| WO | WO 95/13527 | 5/1995 |

* cited by examiner

*Primary Examiner*—Frank G Font
(74) *Attorney, Agent, or Firm*—Scully, Scott, Murphy & Presser, P.C.

(57) ABSTRACT

A wavelength selection unit includes a light source which emits light of at least a predetermined wavelength region, a collector lens which collects the light emitted from the light source and emits a parallel flux which is inclined relative to a light axis of an optical system of itself, a selective reflection optical system which reflects light of a predetermined wavelength region from the parallel flux selectively, and a returning optical system which returns each reflected flux reflected by the selective reflection optical system symmetrically about a reflected light axis of the selective reflection optical system. The collector lens collects a back flux which is returned by the returning optical system and which is re-reflected by the selective reflection optical system, and forms a light source image of the light source.

18 Claims, 19 Drawing Sheets

FIG.9

| | VARIATION IN INTENSITY OF EMITTED LIGHT (INTENSITY RATIO) | CORRECTION OF INTENSITY VARIATION | | | CORRECTION OF OVERALL INTENSITY | | COMPREHENSIVE CORRECTION |
|---|---|---|---|---|---|---|---|
| | | ND TRANS-MISSIVITY | OD VALUE | ND ROTATIONAL ANGLE $\theta_1$ | CORRECTED AMOUNT | ND ROTATIONAL ANGLE $\theta_2$ | ND ROTATIONAL ANGLE $\theta_3$ |
| FIRST WAVELENGTH REGION | 1.0 | 1.00 | 0.00 | 0.00θ | 0.1 | 0.50θ | 0.50θ |
| SECOND WAVELENGTH REGION | 10.0 | 0.10 | 1.00 | 0.50θ | | 0.50θ | 1.00θ |
| THIRD WAVELENGTH REGION | 100.0 | 0.01 | 2.00 | 1.00θ | | 0.50θ | 1.50θ |

LIGHT SOURCE APPARATUS AND MICROSCOPE APPARATUS

CROSS-REFERENCE TO RELATED APPLICATIONS

This application is based upon and claims the benefit of priority from Japanese Patent Applications No. 2006-135285, filed May 15, 2006, No. 2006-135286, filed May 15, 2006 and No. 2007-077836, filed Mar. 23, 2007.

BACKGROUND OF THE INVENTION

1. Field of the Invention

The present invention relates generally to lighting technique, and specifically to a light source apparatus and a microscope apparatus which extract and emit a specific type of light from light emitted from a light source.

2. Description of the Related Art

There is an increasing demand for microscopes which allow for an observation of a microscopic specimen at high magnification and a high resolution. One of such microscopes in use is an ultraviolet microscope in which ultraviolet radiation is used as illumination light to achieve a high resolution. The ultraviolet microscope uses ultraviolet radiation of a wavelength region ranging from a near-ultraviolet (NUV) region to a deep-ultraviolet (DUV) region. Generally, a wavelength region for which good performance of optical elements such as an objective lens used in the ultraviolet microscope is secured is a narrow wavelength region (e.g. 248±10 nm) centered around a predetermined ultraviolet wavelength (e.g., 248 nm). Therefore, the ultraviolet microscope needs a light source apparatus which extracts light of a predetermined ultraviolet wavelength region from broadband light that is emitted from a light source as suitable for an objective lens as mentioned above so as to emit the extracted light as illumination light.

One generally known technique for extracting light of a predetermined wavelength region from broadband light is to use a wavelength-selective transmission filter or a wavelength-selective reflection filter. The wavelength-selective transmission filter is generally capable of transmitting and extracting light of a predetermined wavelength region. The optical transmissivity of the wavelength-selective transmission filter varies depending on use, specification, design value and the like of each filter, and is approximately 80 to 90%, for example. When it is necessary to increase the wavelength selectivity so as to extract only the light of a predetermined wavelength region as far as possible, several wavelength-selective transmission filters may be used together. However, if two wavelength-selective transmission filters of 80% transmissivity are used together, for example, the total transmissivity is 64%. Then, the intensity of obtained light is not sufficient for the light source of the ultraviolet microscope. Thus, the wavelength-selective transmission filter is disadvantageous in comparison with the wavelength-selective reflection filter mentioned later in that a base material of the filter itself absorbs and reduces the light. Therefore, when the wavelength-selective transmission filter is used, it is difficult to obtain a bright observation image, and for such a purpose, expensive equipment such as a highly sensitive camera is necessary.

On the other hand, the wavelength-selective reflection filter can reflect the light of a predetermined wavelength region by reflectance of 90% or higher depending on the design value of each filter. However, the wavelength-selective reflection filter also reflects light outside the predetermined wavelength region by approximately a few percents. Therefore, the wavelength selectivity thereof is not sufficient in terms of strict extraction of light of only a desired wavelength region. Conventionally, the light emitted from the light source is reflected by the wavelength-selective reflection filters plural times so that the wavelength selectivity is enhanced and the intensity loss at the wavelength-selective filter is suppressed, whereby the light of a desired wavelength region is extracted.

JP-T-8-512137 (published Japanese translation of a PCT application) discloses a configuration of a lighting apparatus which spatially separates light from a light source by splitting the light into two fluxes in different directions with the use of a beam splitter, and extracts light of a desired wavelength with the use of a filter or a wavelength-selective mirror on each light path. The filter or the wavelength-selective mirror which is arranged securely on each light path determines the wavelength of the generated two beams of light. Thus, the lighting apparatus can emit light of two different wavelengths by switching.

Further, JP-A-6-18406 (Japanese patent application laid-open) discloses a light source apparatus which is configured to split light from a light source into two light paths and to combine two beams of light again. In each of the two light paths, a wavelength-selective element which extracts light of a predetermined wavelength region different from a wavelength region of light extracted by a wavelength-selective element in another light path, and a shutter are arranged. Further, another shutter is arranged across two light paths so as to work on both light paths simultaneously. The light source apparatus can emit one of the light beams extracted along the two light paths alternately at a high switching speed by rotationally driving the shutter arranged across the two light paths. Further, the light source apparatus can emit the light extracted along one light path alone by opening only the shutter on the pertinent light path.

Following requirements need to be met when desired light is to be extracted from the light emitted from the light source and to be used for lighting.

With regard to optical devices such as microscopes and examination devices, it is desirable that the light output from the lighting device have sufficient intensity. When light beams of plural wavelength regions are to be extracted from broadband light emitted from one light source, each light beam must be emitted without decrease in intensity as far as possible.

With regard to the apparatus mentioned above, when light beams of plural wavelength regions are to be extracted to be used as illumination light, each light source image corresponding to the light of a particular wavelength region must be focused in a telecentric manner, so that good optical characteristic can be obtained.

Further, it is desirable that the devices have a function of sequentially emitting extracted light beams of various wavelength regions at a high switching speed, or a function of emitting optionally combined light beams. The wavelength region of extracted light may be changed appropriately, or the number of wavelength regions of extracted light may be increased or decreased in design, depending on the type of observation. Even when the number of wavelength regions of light extracted from the light emitted from the light source is increased, for example, the apparatus needs to have a simple and compact configuration and be provided at low cost.

SUMMARY OF THE INVENTION

A light source apparatus according to one aspect of the present invention includes a light source which emits broadband light, a light-collecting optical system which collects light emitted from the light source and emits a parallel flux which is inclined relative to a light axis of the light-collecting optical system, a selective reflection optical system which reflects light of a predetermined wavelength region selectively from the parallel flux, and a returning optical system which returns a light flux reflected by the selective reflection optical system symmetrically about a reflected light axis of the selective reflection optical system. The light-collecting optical system collects a light flux which is returned by the returning optical system and re-reflected by the selective reflection optical system, and forms a light source image of the light source.

A microscope apparatus according to another aspect of the present invention includes a light source apparatus. The light source apparatus includes a light source which emits broadband light, a light-collecting optical system which collects light emitted from the light source and emits a parallel flux which is inclined relative to a light axis of the light-collecting optical system, a selective reflection optical system which reflects light of a predetermined wavelength region selectively from the parallel flux, and a returning optical system which returns a light flux reflected by the selective reflection optical system symmetrically about a reflected light axis of the selective reflection optical system, and the light-collecting optical system collects a light flux which is returned by the returning optical system and re-reflected by the selective reflection optical system, and forms a light source image of the light source.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a table of intensity variation correction and overall intensity correction by the ND filters corresponding to respective wavelength regions;

DETAILED DESCRIPTION OF THE PREFERRED EMBODIMENTS

Exemplary embodiments of the present invention will be described in detail below with reference to the accompanying drawings.

Figure 1:
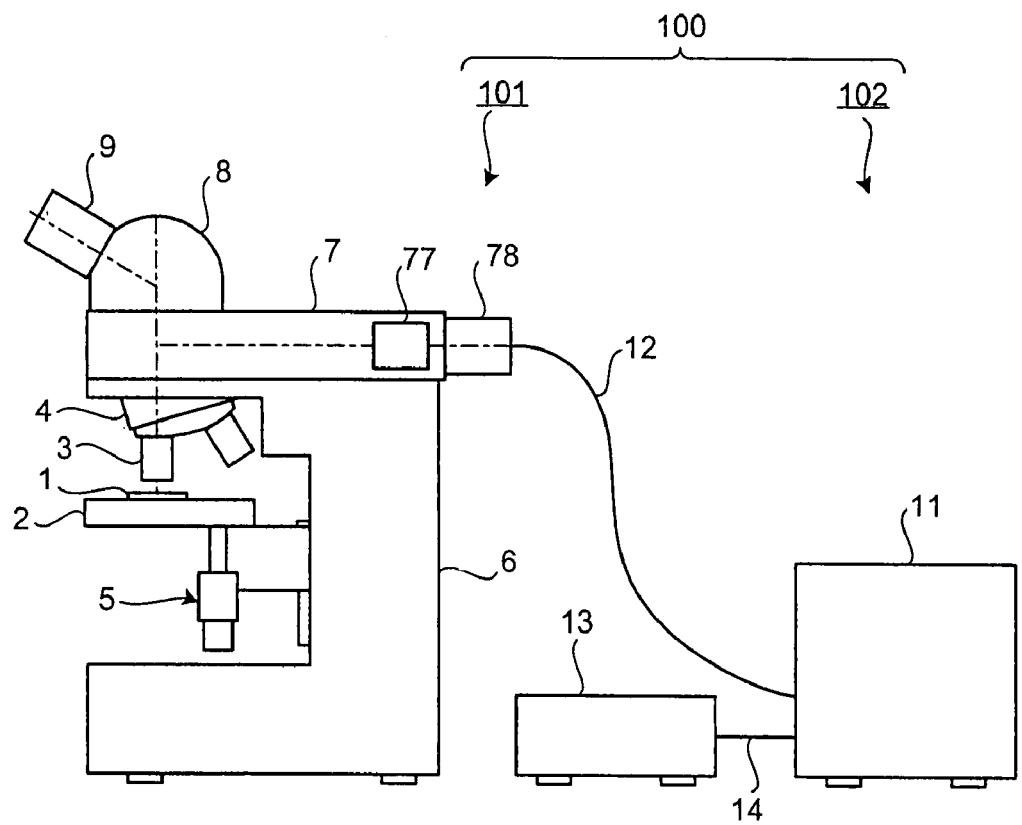
FIG. 1 is a schematic diagram of an overall structure of a microscope apparatus according to a first embodiment of the present invention.

Firstly, a light source apparatus and a microscope apparatus according to a first embodiment of the present invention will be described. FIG. 1 is a schematic diagram of an overall structure of an ultraviolet microscope apparatus 100 which serves as the microscope apparatus according to the first embodiment. As shown in FIG. 1, the ultraviolet microscope apparatus 100 includes a microscope body 101 and a light source apparatus 102. The microscope body 101 includes a stage 2 on which a specimen 1 is placed, an objective lens 3 which is arranged over the specimen 1, a mount 6 which holds the objective lens 3 via a revolver 4 and supports the stage 2 via a focusing mechanism 5, an illumination and imaging unit 7 which is placed on the mount 6, and an eyepiece unit 9 which is mounted on the illumination and imaging unit 7 via a lens barrel 8.

The light source apparatus 102 includes a wavelength-selection unit 11 which includes a light source inside and which extracts ultraviolet light of a predetermined wavelength region from the light emitted by the light source, an optical fiber 12 which receives and guides the ultraviolet light extracted by the wavelength-selection unit 11 to the microscope body 101, and a control unit 13 which controls processing and operations of the wavelength-selection unit 11. The control unit 13 is electrically connected to the wavelength-selection unit 11 via a cable 14.

In the microscope body 101, the objective lens 3 is attached to the revolver 4 in a replaceable manner together with other objective lenses. The objective lens 3 is arranged above the specimen 1 selectively according to a rotational movement of the revolver 4. The focusing mechanism 5 moves the stage 2 up and down so as to change a relative distance between the specimen 1 and the objective lens 3 for focusing. In addition, a plane-driving mechanism not shown moves the stage 2 in a plane perpendicular to a light axis of the objective lens 3 so as to change an observation position of the specimen 1 with respect to the objective lens 3.

Figure 2A:
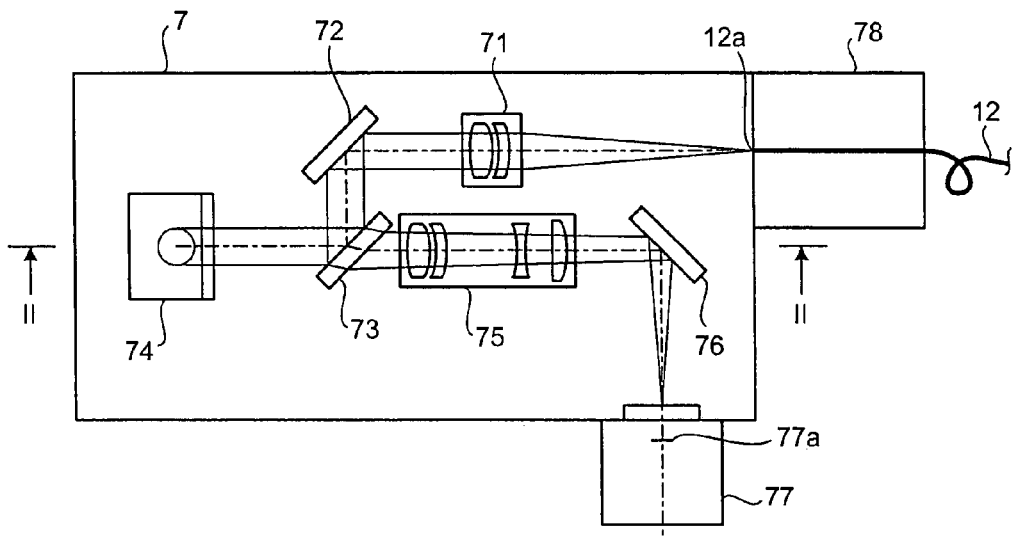
FIG. 2A is a plan view of an internal structure of an illumination and imaging unit provided in the microscope apparatus shown in FIG. 1.
Figure 2B:
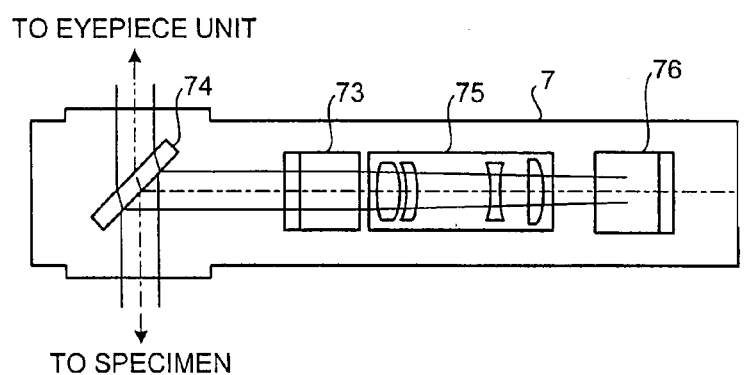
FIG. 2B is a sectional view along line II-II of FIG. 2A.

The illumination and imaging unit 7 projects the ultraviolet light guided through the optical fiber 12 from the wavelength-selection unit 11 to the specimen 1 as illumination light. At the same time, the illumination and imaging unit 7 receives ultraviolet light reflected by the specimen 1 as observation light so as to form an observation image. FIGS. 2A and 2B are diagrams of an internal structure of the illumination and imaging unit 7. FIG. 2A is a plan view, whereas FIG. 2B is a sectional view along line II-II of FIG. 2A. As shown in FIGS. 2A and 2B, the illumination and imaging unit 7 includes an illumination optics 71, a total reflection mirror 72, a half mirror 73, a dichroic mirror 74, an imaging lens 75, a total reflection mirror 76, a camera 77, and a fiber connector 78.

The ultraviolet light emitted from the optical fiber 12 is converted into a parallel flux by the illumination optics 71. The parallel flux passes the total reflection mirror 72, the half mirror 73, and the dichroic mirror 74. As a result, an image on an emission-end surface 12a of the optical fiber 12 is formed on a pupillary plane of the objective lens 3. The ultraviolet light emitted from the image on the emission-end surface 12a is projected onto the specimen 1 through the objective lens 3. Thus, the specimen 1 is subjected to Kohler illumination. The optical fiber 12 is attached to the illumination and imaging unit 7 via the fiber connector 78 so that the emission-end surface 12a of the optical fiber 12 is arranged at a predetermined position relative to the illumination optics 71.

The ultraviolet light reflected by the specimen 1 passes through the objective lens 3, the dichroic mirror 74, and the half mirror 73, and is collected through the imaging lens 75. Thus, the observation image of the specimen 1 is formed on an imaging plane 77a of the camera 77 arranged on a reflected light path of the total reflection mirror 76. The camera 77 picks up the observation image and outputs the picked-up image to a display apparatus and the like not shown.

The dichroic mirror 74 reflects the ultraviolet light as illumination light and transmits the light other than the ultraviolet light. Therefore, when a lighting apparatus (not shown) arranged below the stage 2, for example, irradiates the specimen 1 with visible light, the visible light passes through the objective lens 3, the dichroic mirror 74, and the lens barrel 8, and is observed at the eyepiece unit 9.

In practice, some desire to keep the color of a visible observation image unchanged while observing the visible light from the eyepiece unit 9 regardless of the presence/absence of the illumination and imaging unit 7. This can be achieved by determining spectroscopic characterization of the dichroic mirror 74 in consideration of color temperature conversion ability (i.e., mired). In general, approximately ±10 mireds is sufficient. When a visible-light observation camera (not shown) is used instead of the eyepiece unit 9, a white balance function of the visible light observation camera may be utilized supplementarily.

Figure 3:
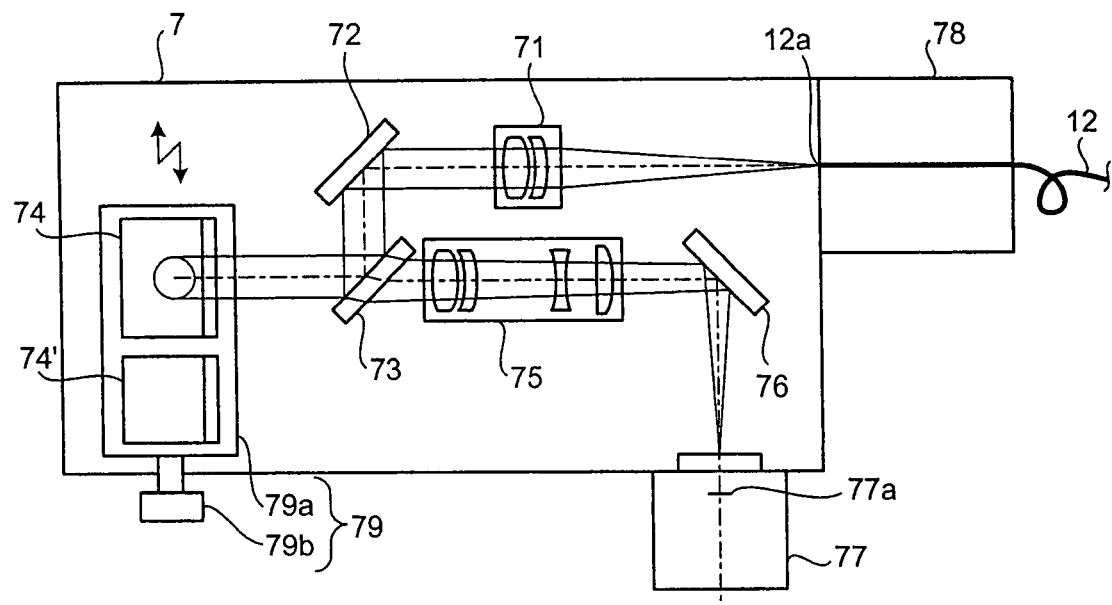
FIG. 3 is a plan view of a structure of a variation of the illumination and imaging unit shown in FIG. 2A.

However, it is difficult to keep the color temperature conversion ability approximately at ±10 mireds, when the user desires to observe an image of the sample 1 formed on the imaging surface 77a of the camera 77 by irradiating the specimen 1 with the light including a visible light component emitted from the emission-end surface 12a. In addition, the white balance function of the visible light observation camera does not always function sufficiently. In such a case, a sliding mechanism 79 may be provided as shown in FIG. 3, for example, so as to retract the dichroic mirror 74 from the light path at the time of visible light observation. The sliding mechanism 79 can insert or retract the dichroic mirror 74, which is mounted in an upper portion of a slider 79a, into or from the light path by moving the slider 79a in an upward or downward direction in FIG. 3 using a driving unit 79b.

A light axis of the light path observed from the eyepiece unit 9 through the lens barrel 8 shifts depending on whether there is the dichroic mirror 74 or not. If it is desirable to prevent the shift of the light axis, the shift of the light axis may be desirably corrected as shown in FIG. 3 by inserting, for example, a dummy glass 74', which is made of the same material to the same thickness as the dichroic mirror 74, into the light path in place of the dichroic mirror 74 at a time the dichroic mirror 74 is retracted from the light path.

Figure 4:
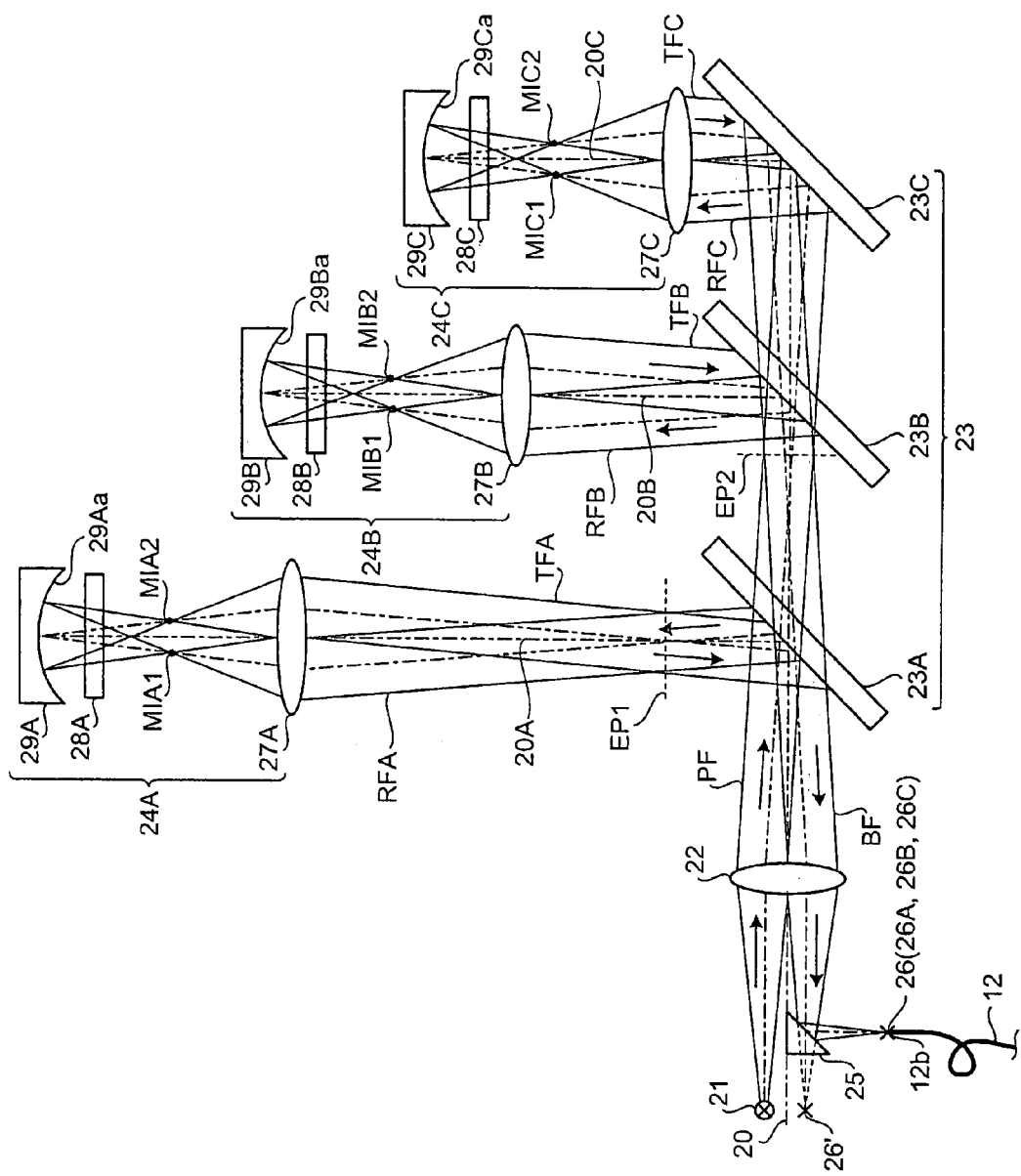
FIG. 4 is a schematic diagram of an internal structure of a wavelength-selection unit provided in a light source apparatus according to the first embodiment of the present invention.

The wavelength-selection unit 11 provided in the light source apparatus 102 will be described. FIG. 4 is a schematic diagram of an internal structure of the wavelength-selection unit 11. As shown in FIG. 4, the wavelength-selection unit 11 includes a light source 21, a collector lens 22, dichroic mirrors 23A to 23C, returning optical systems 24A to 24C, and a total reflection mirror 25.

The light source 21 is a light emitting unit of a lamp such as a mercury lamp, mercury xenon arc lamp, and metal halide lamp, which emits light including ultraviolet light ranging from a near-ultraviolet region to a deep-ultraviolet region. The light source 21 is arranged off a light axis 20 of the collector lens 22 in a front focal plane of the collector lens 22. The collector lens 22 collects the light emitted from the light source 21 and emits a parallel flux PF which is inclined relative to the light axis 20. The parallel flux PF is not limited to a parallel flux in a strict sense, and may be a light flux which is substantially parallel. Accordingly, the position of the light source 21 is also not limited to the front focal plane of the collector lens 22 in a strict sense, and the light source 21 may be arranged at any position near the front focal plane. Though the collector lens 22 is shown as a single lens in FIG. 4, the collector lens 22 may be configured with plural lenses or plural lens groups in practice.

The dichroic mirrors 23A to 23C are arranged on the light axis 20 in series. Each of the dichroic mirrors 23A to 23C reflects ultraviolet light of a different predetermined wavelength region in the parallel flux PF, and transmits light of wavelength regions other than the predetermined wavelength region of the reflected light. For example, the dichroic mirror 23A reflects ultraviolet light of a wavelength region of 240 nm to 290 nm (first wavelength region) and transmits the light of wavelength regions other than 240 nm to 290 nm. Further, the dichroic mirrors 23B and 23C reflect the ultraviolet light of a wavelength region of 290 nm to 330 nm (second wavelength region) and the ultraviolet light of a wavelength region of 330 nm to 385 nm (third wavelength region), respectively, and transmit the light outside the above-specified regions. In practice, the dichroic mirrors 23A to 23C reflect the light outside the first to the third wavelength regions at low reflectance while reflecting the ultraviolet light of the first to the third wavelength regions, respectively, at high reflectance. The dichroic mirrors 23A to 23C together form a selective reflection optical system 23 which serves as a wavelength-selective filter that extracts ultraviolet light of plural predetermined wavelength regions from the light emitted by the light source 21.

The returning optical systems 24A to 24C are arranged on reflected light axes 20A to 20C of the dichroic mirrors 23A to 23C, respectively, so as to return back reflected fluxes RFA, RFB, and RFC reflected from the dichroic mirrors 23A to 23C symmetrically about the reflected light axes 20A to 20C, respectively. The reflected light axes 20A to 20C correspond to images of the light axis 20 reflected by the dichroic mirrors 23A to 23C, respectively. The light axis 20 corresponds to the principal axis of the selective reflection optical system 23, and the reflected light axes 20A to 20C correspond to the principal axes of the returning optical systems 24A to 24C, respectively.

Specifically, the returning optical system 24A includes an imaging lens 27A, a shutter 28A, and a concave mirror 29A. The imaging lens 27A is a lens whose aberration is corrected corresponding to the ultraviolet light of the first wavelength region, and which has a predetermined focal length. The imaging lens 27A is arranged on the reflected light axis 20A away from an exit pupil EP1 of the collector lens 22 at least by the focal length of itself. The imaging lens 27A collects the reflected flux RFA onto a back focal plane as an intermediate image MIA1, which is a first intermediate image of the light source 21.

The concave mirror 29A has a spherical reflecting surface 29Aa having a predetermined curvature radius. The concave mirror 29A is arranged on the reflected light axis 20A away from the intermediate image MIA1 along the reflected light axis 20A by a distance equal to the curvature radius of itself. The arranged position of the concave mirror 29A corresponds to a conjugate position of the exit pupil EP1 of the imaging lens 27A. The concave mirror 29A collects a light flux emitted from the intermediate image MIA1 and forms an intermediate image MIA2, which is a second intermediate image, at a symmetrical position of the intermediate image MIA1 about the reflected light axis 20A.

For example, when the focal length of the imaging lens 27A is 50 mm, the imaging lens 27A is arranged on the reflected light axis 20A away from the exit pupil EP1 at least by 50 mm. If the distance between the imaging lens 27A and the exit pupil EP1 is 100 mm, the conjugate position of the exit pupil EP1 with respect to the imaging lens 27A is a position 100 mm away from the imaging lens 27A. The concave mirror 29A is arranged at this conjugate position. Then, the intermediate image MIA1 is formed at a position 50 mm away from the imaging lens 27A. Therefore, the curvature radius of the concave mirror 29A is set to 50 mm (=100−50) which is equal to the distance from the intermediate image MIA1. The intermediate image MIA2 is formed at a symmetrical position of the intermediate image MIA1 about the reflected light axis 20A 50 mm away from the imaging lens 27A.

In the returning optical system 24A configured as described above, the imaging lens 27A collects the light flux emitted from the intermediate image MIA2 and emits turned flux TFA as a parallel flux which is symmetrical with the reflected flux RFA about the reflected light axis 20A. The turned flux TFA passes through the exit pupil EP1 symmetrically with the reflected flux RFA about the reflected light axis 20A in a reverse direction of the advancing direction of the reflected flux RFA, and is again reflected by the dichroic mirror 23A. As a result, the ultraviolet light of the first wavelength region is reflected twice at the dichroic mirror 23A while the light is going back and forth, and thus extracted at high wavelength selectivity.

The returning optical system 24B includes an imaging lens 27B, a shutter 28B, and a concave mirror 29B, and is configured similarly to the returning optical system 24A. Optimization of the imaging lens 27B, such as correction of aberration is performed corresponding to the ultraviolet light of the second wavelength region. Other than that, the imaging lens 27B is configured and functions similarly to the imaging lens 27A.

The imaging lens 27B has a predetermined focal length for the ultraviolet light of the second wavelength region. The imaging lens 27B is arranged on the reflected light axis 20B away from an exit pupil EP2 of the collector lens 22 at least by the focal length of itself. The imaging lens 27B collects the reflected flux RFB and forms an intermediate image MIB1, which is a first intermediate image of the light source 21, on a back focal plane.

The concave mirror 29B has a spherical reflecting surface 29Ba having a predetermined curvature radius. The concave mirror 29B is arranged on the reflected light axis 20B away from the intermediate image MIB1 by a distance equal to the curvature radius of itself along the reflected light axis 20B. The concave mirror 29B collects the light flux emitted from the intermediate image MIB1 and forms an intermediate image MIB2, which is a second intermediate image, at a symmetrical position of the intermediate image MIB1 about the reflected light axis 20B.

The imaging lens 27B collects the light flux emitted from the intermediate image MIB2 and emits a turned flux TFB as a parallel flux which is symmetrical with the reflected flux RFB about the reflected light axis 20B. The turned flux TFB is reflected again at the dichroic mirror 23B, and passes through the exit pupil EP2 symmetrically with the parallel flux PF about the light axis 20 in a reverse direction from the advancing direction of the parallel flux PF. As a result, the ultraviolet light of the second wavelength region is reflected twice at the dichroic mirror 23B selectively while the light is going back and forth, and thus extracted at high wavelength selectivity.

The returning optical system 24C includes an imaging lens 27C, a shutter 28C, and a concave mirror 29C, and is configured similarly to the returning optical systems 24A and 24B. Optimization of the imaging lens 27C, such as correction of aberration is performed corresponding to the ultraviolet light of the third wavelength region. Other than that, the imaging lens 27C is configured and functions similarly to the imaging lenses 27A and 27B.

The imaging lens 27C has a predetermined focal length for the ultraviolet light of the third wavelength region. The imaging lens 27C is arranged on the reflected light axis 20C away from the exit pupil EP2 of the collector lens 22 at least by the focal length of itself. The imaging lens 27C collects the reflected flux RFC and forms an intermediate image MIC1, which is a first intermediate image of the light source 21, on a back focal plane.

The concave mirror 29C has a spherical reflecting surface 29Ca having a predetermined curvature radius. The concave mirror 29C is arranged on the reflected light axis 20C away from the intermediate image MIC1 along the reflected light axis 20C by a distance equal to the curvature radius of itself. The concave mirror 29C collects a light flux emitted from the intermediate image MIC1 and forms an intermediate image MIC2, which is a second intermediate image, at a symmetrical position of the intermediate image MIC1 about the reflected light axis 20C.

The imaging lens 27C collects the light flux emitted from the intermediate image MIC2 and emits a turned flux TFC as a parallel flux which is symmetrical with the reflected flux RFC about the reflected light axis 20C. The turned flux TFC is reflected again at the dichroic mirror 23C, and passes through the exit pupil EP2 symmetrically with the parallel flux PF about the light axis 20 in a reverse direction from the advancing direction of the parallel flux PF. As a result, the ultraviolet light of the third wavelength region is reflected twice at the dichroic mirror 23C selectively while the light is going back and forth, and thus extracted at high wavelength selectivity.

When the imaging lenses 27A to 27C are lenses of the same specification whose aberration are well corrected for the ultraviolet light of the first to the third wavelength regions, respectively, for example, the returning optical systems 24A to 24C are arranged so that the length of the light paths from the collector lens 22 to the returning optical systems 24A to 24C are equal to each other. In other words, the returning optical systems 24A to 24C are arranged so that the length of the light path from the exit pupil EP1 to the imaging lens 27A, the length of the light path from the exit pupil EP2 to the imaging lens 27B, and the length of the light path from the exit pupil EP2 to the imaging lens 27C are equal to each other.

The concave mirrors 29A to 29C employed in the returning optical systems 24A to 24C are not limited to spherical mirrors, and any reflective imaging elements, such as parabolic mirrors can be used as the concave mirrors 29A to 29C, as far as these reflective imaging elements can form the intermediate images MIA2, MIB2, and MIC2 as described above. Further, each of the concave mirrors 29A to 29C is not limited to a single reflective imaging element, and an imaging optical system configured with optional numbers of optical elements can be employed. Further, though shown as a single lens in FIG. 4, each of the imaging lenses 27A to 27C may be configured with plural lenses or plural lens groups in practice.

The light fluxes of the first to the third wavelength regions re-reflected by the dichroic mirrors 23A to 23C are combined coaxially via the dichroic mirror 23A, and collected by the collector lens 22 as a back flux BF. The collector lens 22, whose aberration is well corrected corresponding to the ultraviolet light beams of the first to the third wavelength regions, converges the ultraviolet light beams of the first to the third wavelength regions in the back flux BF onto an identical position via the total reflection mirror 25, and forms light source images 26A, 26B, and 26C telecentrically. The light source images 26A to 26C serve as secondary light sources of the ultraviolet light beams of the first to the third wavelength regions, respectively.

If the total reflection mirror 25 is not present, the collector lens 22 forms a light source image 26' at a symmetrical position of the light source 21 about the light axis 20. The arranged position of the total reflection mirror 25 can be any position on the light path between the light source image 26' and the collector lens 22 as far as an image-forming light flux forming the light source image 26' and an effective light flux emitted from the light source 21 do not interfere spatially.

A light source image 26 as an integration of the light source images 26A to 26C serves as a secondary light source which emits ultraviolet light beams of the first to the third wavelength regions selectively according to the opening/closing operations of the shutters 28A to 28C. The light source image 26 emits the ultraviolet light of the wavelength region corresponding to the opened shutter among the shutters 28A to 28C, and emits the ultraviolet light of any combination of the first to the third wavelength regions. The optical fiber 12 has an incident-end surface 12b arranged at a focusing position of the light source image 26. The optical fiber 12 receives the ultraviolet light emitted from the light source image 26 at the incident-end surface 12b and emits the light from the emission-end surface 12a attached to the illumination and imaging unit 7. Thus, the light source apparatus 102 of the first embodiment can emit any combination of the ultraviolet light of the first to the third wavelength regions from the emission-end surface 12a.

Each of the shutters 28A to 28C is opened/closed by an opening/closing driving mechanism (not shown), so as to block the light flux respectively between imaging lenses 27A to 27C and the concave mirrors 29A to 29C appropriately. The opening/closing driving mechanism is electrically connected to the control unit 13, and drives the opening and closing of the shutters 28A to 28C, respectively, based on a command supplied by the control unit 13. Each of the shutters 28A to 28C can be any one of various shutters such as a mechanism which mechanically drives a vane or the like, or a shutter configured of, for example, liquid crystals, whose transmissivity is electrically controlled.

Further, the positions and the sizes of the shutters 28A to 28C are not limited to those shown in FIG. 4. As far as the shutters 28A to 28C can block at least one of the reflected flux and the turned flux between the dichroic mirrors 23A to 23C and the returning optical systems 24A to 24C, or at least one of the reflected flux and the turned flux in the returning optical systems 24A to 24C, shutters 28A to 28C can be in any size and arranged at any positions.

As described above, the light source apparatus 102 according to the first embodiment includes the collector lens 22 which collects the light emitted from the light source 21 and emits the parallel flux PF inclined relative to the light axis 20, the selective reflection optical system 23 which is configured with the dichroic mirrors 23A to 23C that selectively reflect the ultraviolet light beams of the first to the third wavelength regions in the parallel flux PF, and the returning optical systems 24A to 24C which return the reflected fluxes RFA, RFB, and RFC reflected by the selective reflection optical system 23 about the corresponding reflected light axes 20A to 20C. The collector lens 22 collects the light fluxes which are returned in the returning optical systems 24A to 24C and re-reflected by the dichroic mirrors 23A to 23C, respectively, so as to form the light source image 26 of the light source 21. Thus, the ultraviolet light beams of the first to the third wavelength regions can be extracted without the degradation in the intensity dissimilar to the case where the half mirror is arranged in the light path. At the same time, all of the light source images 26A to 26C, which serve as the secondary light source of the ultraviolet light of each wavelength region, can be formed telecentrically, whereby the orientational characteristic of the light source 21 can be maintained.

Further, the light source apparatus 102 is provided with the shutters 28A to 28C in the returning optical systems 24A to 24C, and each of the shutters 28A to 28C can be opened/closed appropriately based on the command supplied from the control unit 13, whereby any combination of the ultraviolet light beams of the first to the third wavelength regions can be emitted.

Further, in the light source apparatus 102, the returning optical systems 24A to 24C can be arranged after the total reflection mirror and the like is arranged in each of the light paths leading respectively from the dichroic mirrors 23A to 23C to the imaging lenses 27A to 27C so as to make each of the light paths appropriately returned. Therefore, the wavelength-selection unit 11 as a whole can be configured in a compact manner.

Further, since the optical system provided in the wavelength-selection unit 11 of the light source apparatus 102 does not need an optical element to be arranged at a position where the ultraviolet light is converged and the energy is concentrated, damages to each optical element caused generally by the reception of the ultraviolet light can be alleviated, whereby the life of the optical element can be lengthened. Still further, since the convergence of the ultraviolet light on the surface of each optical element is not necessary, the decrease in light intensity caused by the light scattering attributable to the dust attached to the surface, the scratch on the surface, and the like can be reduced.

Figure 5:
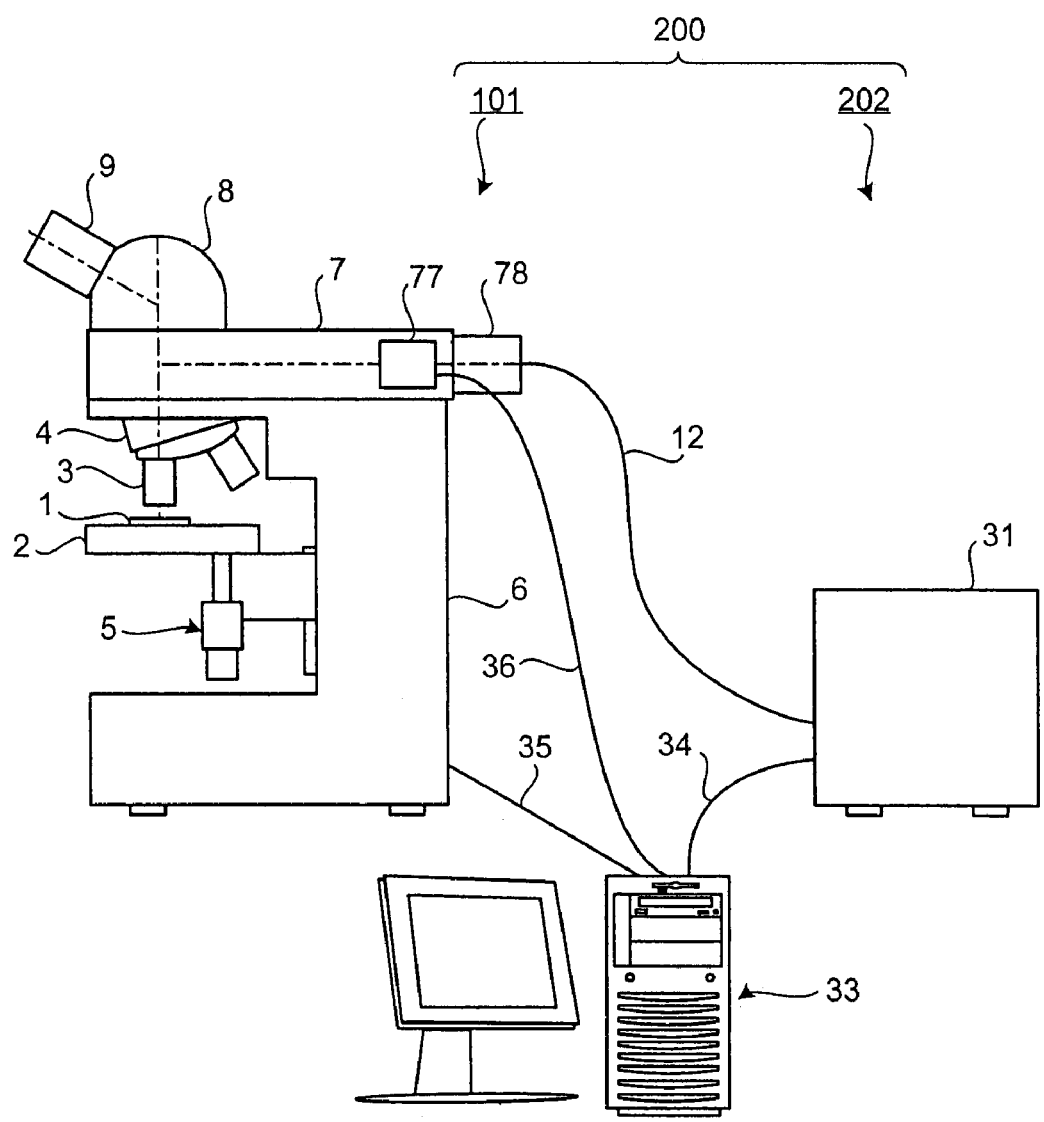
FIG. 5 is a schematic diagram of an overall structure of a microscope apparatus according to a second embodiment of the present invention.

A light source apparatus and a microscope apparatus according to a second embodiment of the present invention will be described. FIG. 5 is a schematic diagram of an overall structure of an ultraviolet microscope apparatus 200 which serves as the microscope apparatus according to the second embodiment. As shown in FIG. 5, the ultraviolet microscope apparatus 200 is based on the ultraviolet microscope apparatus 100, and includes a light source apparatus 202 in place of the light source apparatus 102. The light source apparatus 202 is based on the light source apparatus 102, and includes a wavelength-selection unit 31 and a control unit 33 in place of the wavelength-selection unit 11 and the control unit 13.

The control unit 33 is electrically connected to the wavelength-selection unit 31, a microscope control unit (not shown) in the mount 6, and the camera 77 via cables 34 to 36, respectively, so as to control processing and operations of these units. For example, the control unit 33 sets various parameters of the microscope body 101, positions the specimen 1 by driving the stage 2 vertically and horizontally, performs focusing, and switches the objective lens 3 by rotationally driving the revolver 4, via the microscope control unit. Further, the control unit 33 controls observation-image pick-up by the camera 77, and recording, display, and the like of picked-up images. The control of the wavelength-selection unit 31 will be described later.

Figure 6:
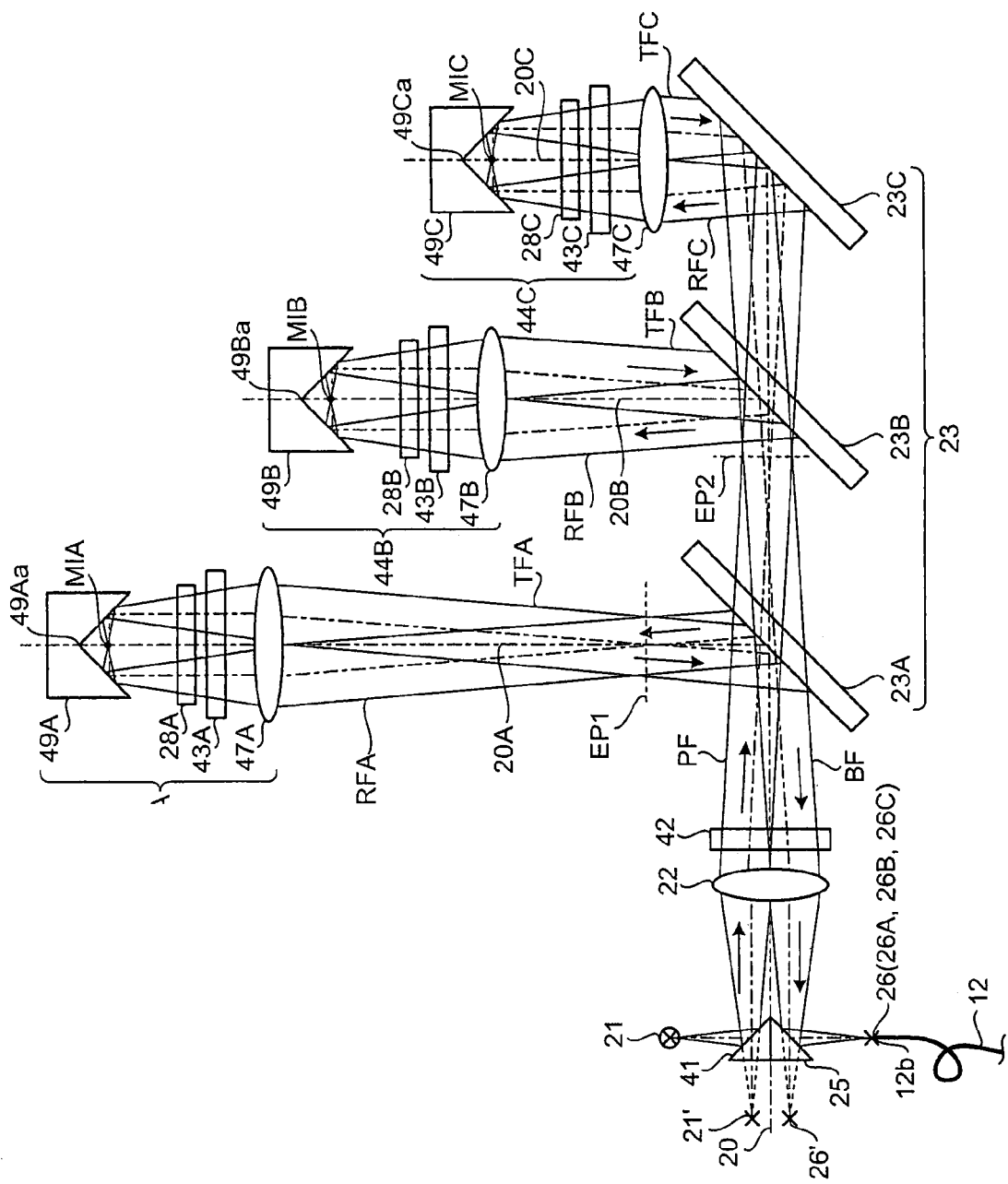
FIG. 6 is a schematic diagram of an internal structure of a wavelength-selection unit provided in a light source apparatus according to the second embodiment of the present invention.

The wavelength-selection unit 31 will be described. FIG. 6 is a schematic diagram of an internal structure of the wavelength-selection unit 31. As shown in FIG. 6, the wavelength-selection unit 31 is based on the wavelength-selection unit 11, and includes returning optical systems 44A to 44C in place of the returning optical systems 24A to 24C, and further includes a total reflection mirror 41 and a neutral density (ND) filter 42.

The light source 21 of the wavelength-selection unit 31 is arranged so that a mirror image light source 21' of the light source 21 generated by the total reflection mirror 41 overlaps with the light source 21 of the wavelength-selection unit 11. The collector lens 22 collects the light emitted from the light source 21 via the total reflection mirror 41, and emits the parallel flux PF which is inclined relative to the light axis 20. The total reflection mirror 41 may be arranged at any position as far as it is on the light path between the mirror-image light source 21' and the collector lens 22, and effective light flux emitted from the light source 21 and the image-forming light flux forming the light source image 26' do not interfere spatially.

The parallel flux PF passes through the ND filter 42 and is incident on the dichroic mirror 23A. The ND filter 42 is formed from a disk-like substrate with small holes. The concentration of the holes varies in a circumferential direction. Therefore, when a rotational driving mechanism (not shown) rotates the ND filter 42, the intensity of the passing parallel flux PF can be changed appropriately. The rotational driving mechanism is electrically connected to the control unit 33 and rotationally drives the ND filter 42 based on the command from the control unit 33. The ND filter 42 serves to adjust the illumination light. The ND filter may be a transmission filter.

The returning optical systems 44A to 44C are arranged on the reflected light axes 20A to 20C of the dichroic mirrors 23A to 23C, respectively, and return the reflected fluxes RFA to RFC reflected by the dichroic mirrors 23A to 23C, respectively, symmetrically about the reflected light axes 20A to 20C.

Specifically, the returning optical system 44A includes an imaging lens 47A, an ND filter 43A, the shutter 28A, and a retroreflector 49A. The imaging lens 47A is a lens whose aberration is corrected for the ultraviolet light of the first wavelength region, and which has a predetermined focal length. The imaging lens 47A is arranged on the reflected light axis 20A away from the exit pupil EP1 of the collector lens 22 by the focal length of itself. The imaging lens 47A collects the reflected flux RFA reflected by the dichroic mirror 23A and forms an intermediate image MIA which is an intermediate image of the light source 21 in a telecentric manner.

The retroreflector 49A is a hollow retroreflective optical element configured with three total reflection surfaces that are perpendicular to one another, for example. The retroreflector 49A is arranged so that an apex 49Aa which is a crossing point of three total reflection surfaces is positioned on the reflected light axis 20A. Further, the retroreflector 49A is arranged so that the intermediate image MIA is formed on a plane which is positioned inside (i.e., in a hollow portion of) the retroreflector 49A and which includes the reflected light axis 20A (in FIG. 6, a plane which includes the reflected light axis 20A and which is perpendicular to a paper surface). Thus, the retroreflector 49A retroreflects the light flux from the imaging lens 47A symmetrically about the reflected light axis 20A. In FIG. 6, the retroreflector 49A is shown as if the retroreflector 49A reflects the image-forming light flux from the imaging lens 47A only in the paper plane for the simplicity and convenience.

In the returning optical system 44A having the above described structure, the imaging lens 47A collects the light flux retroreflected by the retroreflector 49A, and emits the turned flux TFA which is a parallel flux symmetrical with the reflected flux RFA about the reflected light axis 20A. The turned flux TFA passes through the exit pupil EP1 symmetrically with the reflected flux RFA about the reflected light axis 20A in a reverse direction with the advancing direction of the reflected flux RFA, and is reflected by the dichroic mirror 23A again. As a result, the ultraviolet light of the first wavelength region is reflected twice by the dichroic mirror 23A while going back and forth, whereby the light is extracted with high wavelength selectivity.

The returning optical system 44B includes an imaging lens 47B, an ND filter 43B, the shutter 28B, and a retroreflector 49B and is configured similarly to the returning optical system 44A. Optimization of the imaging lens 47B, such as the correction of aberration for the ultraviolet light of the second wavelength region is performed on the imaging lens 47B. Other than that, the imaging lens 47B is configured and functions similarly to the imaging lens 47A.

The imaging lens 47B has a predetermined focal length for the ultraviolet light of the second wavelength region. The imaging lens 47B is arranged on the reflected light axis 20B away from the exit pupil EP2 of the collector lens 22 at least by the focal length of itself. The imaging lens 47B collects the reflected flux RFB reflected by the dichroic mirror 23B and forms an intermediate image MIB, which serves as an intermediate image of the light source 21 in a telecentric manner.

The retroreflector 49B is a hollow retroreflective optical element configured similarly to the retroreflector 49A. The retroreflector 49B is arranged so that an apex 49Ba is positioned on the reflected light axis 20B. Further, the retroreflector 49B is arranged so that the intermediate image MIB is formed on a plane which is positioned inside (i.e., in a hollow portion of) the retroreflector 49B and which includes the reflected light axis 20B (in FIG. 6, a plane which includes the reflected light axis 20B and which is perpendicular to the paper surface). Thus, the retroreflector 49B retroreflects the light flux from the imaging lens 47B symmetrically about the reflected light axis 20B.

The imaging lens 47B collects the light flux retroreflected by the retroreflector 49B, and emits turned flux TFB as a parallel flux which is symmetric with the reflected flux RFB about the reflected light axis 20B. The turned flux TFB is re-reflected by the dichroic mirror 23B and passes through the exit pupil EP2 symmetrically with the parallel flux PF about the light axis 20 in a reverse direction from the advancing direction of the parallel flux PF. As a result, the ultraviolet light of the second wavelength region is reflected twice by the dichroic mirror 23B selectively while going back and forth, whereby the light is extracted with high wavelength selectivity.

The returning optical system 44C includes an imaging lens 47C, an ND filter 43C, the shutter 28C, and a retroreflector 49C and is configured similarly to the returning optical systems 44A and 44B. Optimization of the imaging lens 47C, such as the correction of aberration for the ultraviolet light of the third wavelength region is performed on the imaging lens 47C. Other than that, the imaging lens 47C is configured and functions similarly to the imaging lenses 47A and 47B.

The imaging lens 47C has a predetermined focal length for the ultraviolet light of the third wavelength region. The imaging lens 47C is arranged on the reflected light axis 20C away from the exit pupil EP2 of the collector lens 22 at least by the focal length of itself. The imaging lens 47C collects the reflected flux RFC reflected by the dichroic mirror 23C and forms an intermediate image MIC, which serves as an intermediate image of the light source 21, in a telecentric manner.

The retroreflector 49C is a hollow retroreflective optical element configured similarly to the retroreflectors 49A and 49B. The retroreflector 49C is arranged so that an apex 49Ca is positioned on the reflected light axis 20C. Further, the retroreflector 49C is arranged so that the intermediate image MIC is formed on a plane which is positioned inside (i.e., in a hollow portion of) the retroreflector 49C and which includes the reflected light axis 20C (in FIG. 6, a plane which includes the reflected light axis 20C and which is perpendicular to the paper surface). Thus, the retroreflector 49C retroreflects the light flux from the imaging lens 47C symmetrically about the reflected light axis 20C.

The imaging lens 47C collects the light flux retroreflected by the retroreflector 49C, and emits the turned flux TFC as a parallel flux which is symmetric with the reflected flux RFC about the reflected light axis 20C. The turned flux TFC is re-reflected by the dichroic mirror 23C and passes through the exit pupil EP2 symmetrically with the parallel flux PF about the light axis 20 in a reverse direction from the advancing direction of the parallel flux PF. As a result, the ultraviolet light of the third wavelength region is reflected twice by the dichroic mirror 23C while going back and forth, whereby the light is extracted with high wavelength selectivity.

When the imaging lenses 47A to 47C are lenses of the same specification whose aberration are well corrected for the ultraviolet light of the first to the third wavelength regions, respectively, for example, the returning optical systems 44A to 44C are arranged so that the length of the light paths from the collector lens 22 to the returning optical systems 44A to 44C are equal to each other. In other words, the returning optical systems 44A to 44C are arranged so that the length of the light path from the exit pupil EP1 to the imaging lens 47A, the length of the light path from the exit pupil EP2 to the imaging lens 47B, and the length of the light path from the exit pupil EP2 to the imaging lens 47C are equal to each other.

The retroreflectors 49A to 49C employed in the returning optical systems 44A to 44C are not limited to retroreflective optical elements configured in a hollow shape. For example, a block-shaped retroreflective optical element such as a corner cube can be employed. Further, each of the retroreflectors is not limited to a single retroreflective optical element, and a retroreflective optical system configured with optional numbers of optical elements can be employed. Further, though shown as a single lens in FIG. 6, the imaging lens 47A may be configured with plural lenses or plural lens groups in practice.

The light fluxes of the first to the third wavelength regions re-reflected by the dichroic mirrors 23A to 23C are combined coaxially through the dichroic mirror 23A, pass through the ND filter 42, and are collected by the collector lens 22 as the back flux BF. The collector lens 22, similarly to the first embodiment, forms light source images 26A, 26B, and 26C corresponding to the ultraviolet light beams of the first to the third wavelength regions from the back flux BF at the identical position in a telecentric manner. The light source images 26A to 26C serve as secondary light sources for the ultraviolet light of the first to the third wavelength regions, respectively.

The light source image 26 emits any combination of the ultraviolet light beams of the first to the third wavelength regions according to the opening/closing operations of the shutters 28A to 28C, similarly to the first embodiment. Thus, the light source apparatus 202 can emit the ultraviolet light of any combination of the first to the third wavelength regions from the emission-end surface 12a.

The opening/closing driving mechanism, which opens/closes the shutters 28A to 28C, is electrically connected to the control unit 33, and opens/closes the shutters 28A to 28C based on the command supplied by the control unit 33. Further, the positions and the sizes of the shutters 28A to 28C are not limited to those shown in FIG. 6. As far as the shutters 28A to 28C can block at least one of the reflected flux and the turned flux between the dichroic mirrors 23A to 23C and the returning optical systems 44A to 44C, or at least one of the reflected flux and the turned flux in the returning optical systems 44A to 44C, shutters 28A to 28C can be in any size and arranged at any positions.

The ND filters 43A to 43C are formed similarly to the ND filter 42. When rotated by a rotational driving mechanism (not shown) independently, each of the ND filters 43A to 43C changes the intensity of at least one of the fluxes going back and forth in the returning optical systems 44A to 44C appropriately. The rotational driving mechanism is electrically connected to the control unit 33, and rotationally drives each of the ND filters 43A to 43C based on the command from the control unit 33. The arranged positions of the ND filters 43A to 43C are not limited to positions inside the returning optical systems 44A to 44C. The ND filters 43A to 43C may be arranged on the light paths between the dichroic mirror 23A to 23C and the returning optical systems 44A to 44C, respectively. Here, the ND filters 43A to 43C may be any elements that change the intensity of at least one of the passing fluxes.

Figure 7A:
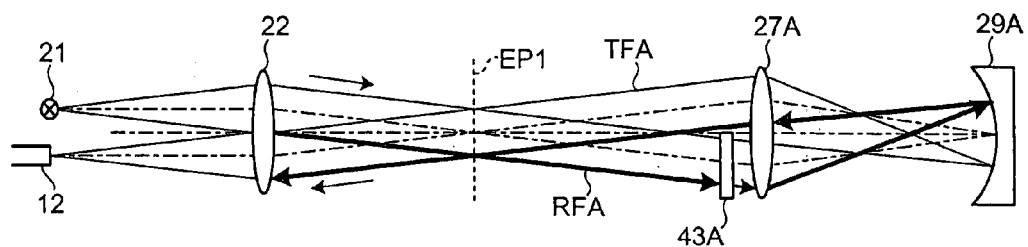
FIG. 7A is a schematic diagram showing an arrangement of an ND filter.
Figure 8:
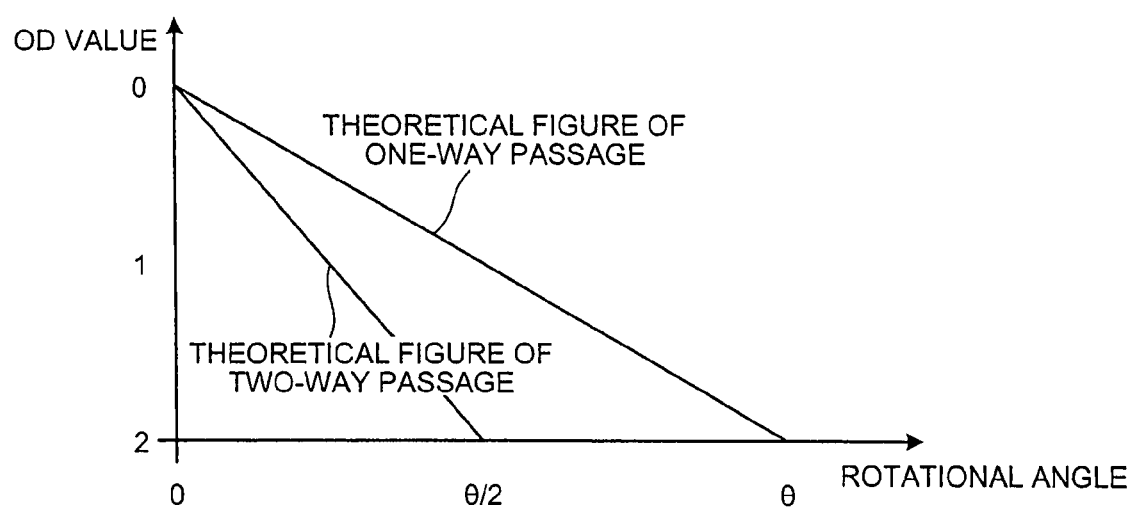
FIG. 8 is a graph showing a characteristic of optical density of the ND filter.

When the ND filters 43A to 43C arranged in the light paths of the reflected fluxes RFA, RFB, RFC or the turned fluxes TFA, TFB, and TFC that are parallel fluxes, respectively, are formed as elements with plural small holes, transmissivity characteristics, i.e., optical density (i.e., OD value) characteristics of the ND filters 43A to 43C with respect to the rotational angle in a circumferential direction can be made to match with a theoretical figure for one-way passage as calculated based on an aperture ratio of the small holes. For example, when the ND filter 43A is arranged so that only the reflected flux RFA passes therethrough as shown in FIG. 7A, optical density characteristic corresponding to the theoretical figure of one-way passage as shown in FIG. 8 can be obtained. Here, FIG. 7A is a schematic diagram of main portions of the light path for the ultraviolet light of the first wavelength region.

Figure 7B:
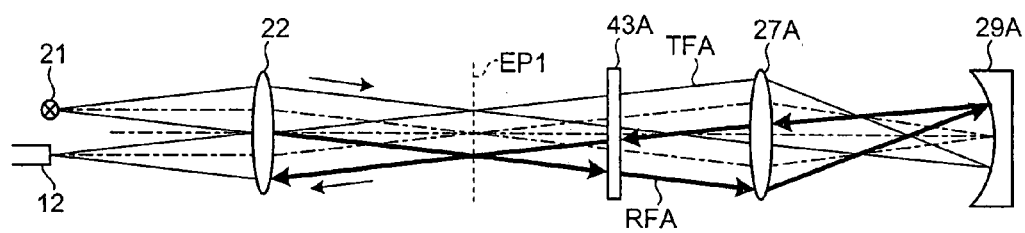
FIG. 7B is a schematic diagram showing another arrangement of the ND filter.
Figure 7C:
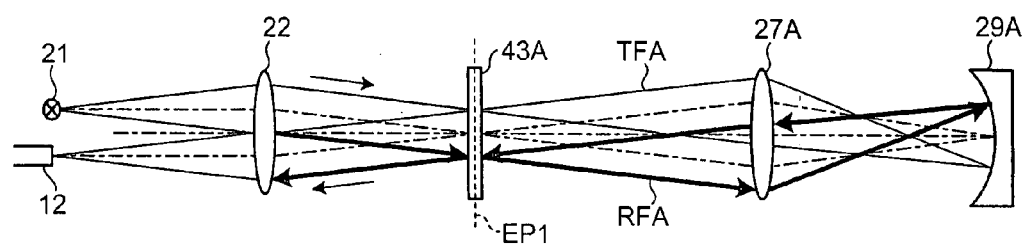
FIG. 7C is a schematic diagram showing still another arrangement of the ND filter.

On the other hand, when the ND filters 43A to 43C are arranged so as to transmit both the reflected fluxes RFA, RFB, and RFC and the turned fluxes TFA, TFB, and TFC, respectively, the optical density characteristics can be made to match with a theoretical figure of two-way passage as calculated based on a square value of the aperture ratio of the small holes. For example, when the ND filter 43A is arranged so that the reflected flux RFA and the turned flux TFA pass through the ND filter 43A as shown in FIG. 7B, the optical density characteristics corresponding to the theoretical figure of two-way passage as shown in FIG. 8 can be obtained. When the ND filters 43A to 43C are arranged on the exit pupil EP1 of the collector lens 22 as shown in FIG. 7C, the reflected flux RFA and the turned flux TFA pass through the ND filters 43A to 43C at the same positions, i.e., through the same small holes, whereby the optical density characteristics corresponding to the theoretical figures of one-way passage as shown in FIG. 8 can be obtained.

As described above, the light source apparatus 202 according to the second embodiment includes returning optical systems 44A to 44C in place of the returning optical systems 24A to 24C in the light source apparatus 102 according to the first embodiment, whereby the light source apparatus 202 is able to have the same advantages as those of the light source apparatus 102. In other words, in the light source apparatus 202, the ultraviolet light of the first to the third wavelength regions can be extracted without the degradation in the intensity dissimilar to the case where the half mirror is arranged in the light path. At the same time, all of the light source images 26A to 26C, which serve as the secondary light sources of the ultraviolet light of respective wavelength regions, can be formed telecentrically, whereby the orientational characteristic of the light source 21 can be maintained.

Further, the light source apparatus 202 is provided with the shutters 28A to 28C in the returning optical systems 44A to 44C, and each of the shutters 28A to 28C can be opened/closed appropriately based on the command supplied from the control unit 33, whereby optional switching to any one of the ultraviolet light beams of the first to the third wavelength regions can be performed. Further, any combination of the ultraviolet light beams of the first to the third wavelength regions can be emitted.

Further, in the light source apparatus 202, the returning optical systems 44A to 44C can be arranged after the total reflection mirror and the like is arranged in each of the light paths leading from the dichroic mirrors 23A to 23C to the imaging lenses 47A to 47C so as to make each of the light paths appropriately returned. Therefore, the wavelength-selection unit 31 as a whole can be configured in a compact manner.

Still further, in the light source apparatus 202, the intensity of the parallel flux PF and the back flux BF passing through the ND filter 42 is changeable based on the control of the control unit 33. Therefore, the overall intensity of the ultraviolet light emitted from the light source image 26 can be adjusted as appropriate. Thus, the optimal intensity can be set for the illumination light according to an observation condition such as the reflectance characteristic of the specimen 1 at a time the observation is performed with the microscope body 101. The ND filter 42 may be configured so as to change the intensity of one of the parallel flux PF and the back flux BF passing therethrough.

Still further, in the light source apparatus 202, the intensity of light fluxes passing through the ND filters 43A to 43C can be changed independently based on the control by the control unit 33. Therefore, the balance of the intensity of ultraviolet light beams of the first to the third wavelength regions emitted from the light source image 26 can be adjusted appropriately. Thus, the variation in the intensity of light emitted from the light source 21 can be corrected for each of the first to the third wavelength regions, and the ultraviolet light including the same intensity of light of each wavelength region can be directed to the specimen 1 in the microscope body 101.

When the intensity of light passing each of the ND filters 43A to 43C is equally changed, an overall intensity of the ultraviolet light emitted from the light source image 26 can be adjusted similarly to the case of the ND filter 42. Further, consider using the ND filters 43A to 43C having the fixed aperture ratio of small holes (or the ratio of intensity of transmitted light) with respect to the rotational angle in the circumferential direction. In this case, even if the rotational angular position is made different for each of the ND filters 43A to 43C for the correction of the variation in light intensity of the first to the third wavelength regions in the light from the light source 21, the overall intensity can be adjusted without changing the variation-corrected state when the ND filters 43A to 43C are rotated by the same angular amount from the respective positions.

For example, when there is variation (1:10:100) in the intensity of light emitted from the light source 21 among the light of the first to the third wavelength regions as shown in FIG. 9, the variation in the light intensity can be corrected by setting the rotational angles in the circumferential direction to ND rotational angles $\theta_1$ in consideration of the transmissivity or the OD value of the ND filters 43A to 43C corresponding to respective wavelength regions. Further, the overall intensity can be corrected by a desired amount, when the overall intensity is set to a desired corrected value (e.g., 0.1) and the rotational angles in the circumferential direction of the ND filters 43A to 43C of respective wavelength regions are set equally to an ND rotational angle $\theta_2$. It can be seen from the foregoing that when comprehensive corrections of the variation in intensity and the overall intensity are desired, the rotational angles in the circumferential direction of the ND filters 43A to 43C of respective wavelength regions only need to be set to an ND rotational angle $\theta_3$. The ND rotational angle $\theta_3$ is a sum of the ND rotational angle $\theta_1$ and the ND rotational angle $\theta_2$ ($\theta_3 = \theta_1 + \theta_2$).

As can be seen from the foregoing, when the ND filters 43A to 43C are controlled as described above, the ND filter 42 can be eliminated. Alternatively, the ND filter 42 and the ND filters 43A to 43C may be employed for different functions. For example, when the overall intensity is to be adjusted, the ND filter 42 may be used for coarse adjustment, and the ND filters 43A to 43C may be used for fine adjustment.

Figure 10:
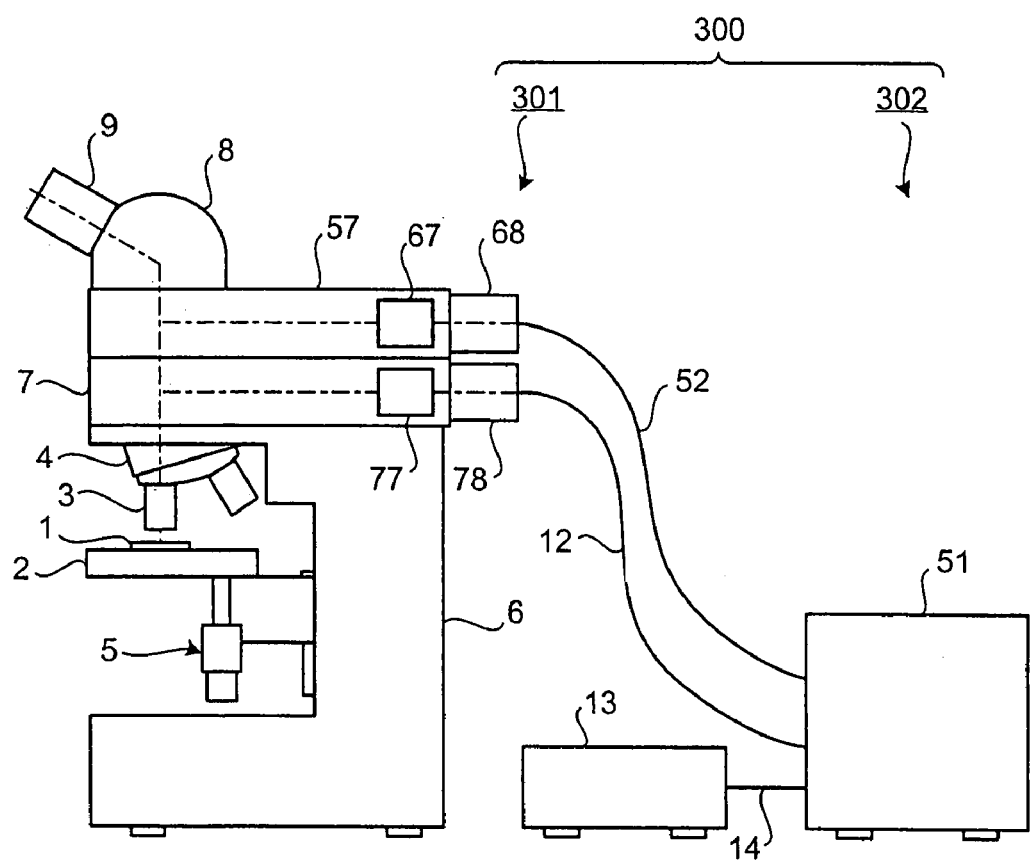
FIG. 10 is a schematic diagram of an overall structure of a microscope apparatus according to a third embodiment of the present invention.

A light source apparatus and a microscope apparatus according to a third embodiment of the present invention will be described. FIG. 10 is a schematic diagram of an overall structure of an ultraviolet microscope apparatus 300 which serves as a microscope apparatus according to the third embodiment. As shown in FIG. 10, the ultraviolet microscope apparatus 300 is based on the ultraviolet microscope apparatus 100 and further includes a microscope body 301 and a light source apparatus 302 in place of the microscope body 101 and the light source apparatus 102. Further, the microscope body 301 is based on the microscope body 101 and further includes an illumination and imaging unit 57. Further, the light source apparatus 302 is based on the light source apparatus 102, includes a wavelength-selection unit 51 in place of the wavelength-selection unit 11, and further includes an optical fiber 52.

Figure 11A:
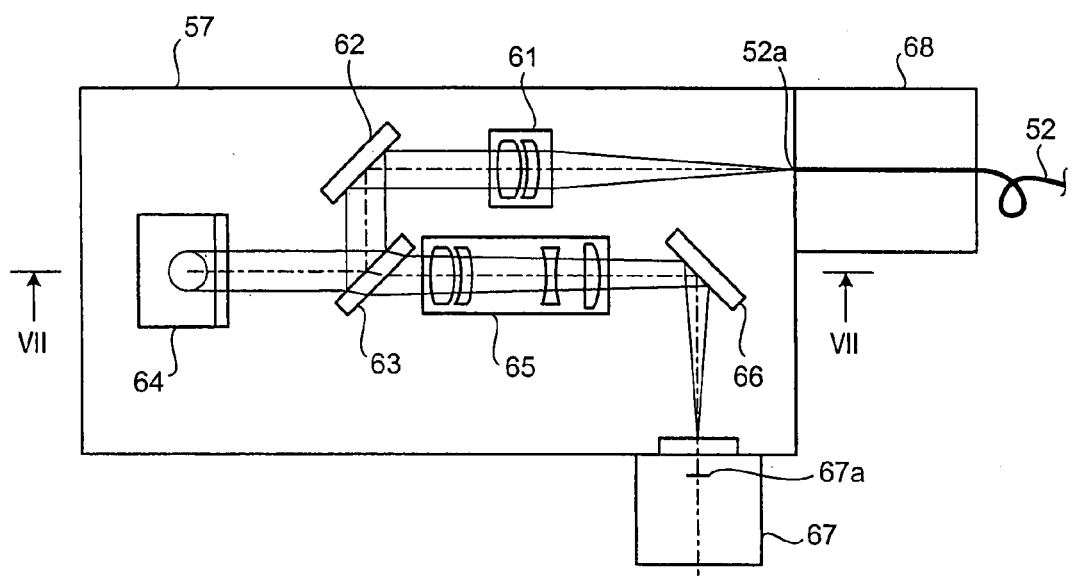
FIG. 11A is a plan view of an internal structure of an illumination and imaging unit provided in the microscope apparatus shown in FIG. 10.
Figure 11B:
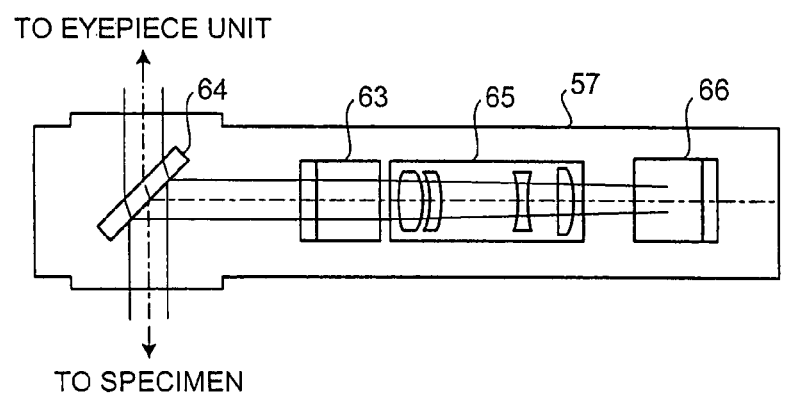
FIG. 11B is a sectional view along line VII-VII of FIG. 11A.

The illumination and imaging unit 57 is mounted on the illumination and imaging unit 7. The illumination and imaging unit 57 projects a visible light guided through the optical fiber 52 from the wavelength-selection unit 51 onto the specimen 1 as illumination light, receives the visible light reflected from the specimen 1 as visible observation light and forms a visible observation image. FIGS. 11A and 11B are diagrams of an internal structure of the illumination and imaging unit 57. FIG. 11A is a plan view and FIG. 11B is a sectional view taken along line VII-VII of FIG. 11A. As shown in FIGS. 11A and 11B, the illumination and imaging unit 57 includes an illumination optics 61, a total reflection mirror 62, a half mirror 63, a dichroic mirror 64, an imaging lens 65, a total reflection mirror 66, a camera 67, and a fiber connector 68.

The illumination optics 61 collects the visible light emitted from the optical fiber 52, passes the light through the total reflection mirror 62, the half mirror 63, and the dichroic mirror 64, and forms an image, which is an image on an emission-end surface 52a of the optical fiber 52, on a pupillary plane of the objective lens 3. The visible light emitted from the image on the emission-end surface 52a is projected onto the specimen 1 through the objective lens 3. Thus, the specimen 1 is subjected to Kohler illumination. The optical fiber 52 is attached to the illumination and imaging unit 57 via the fiber connector 68 so that the emission-end surface 52a of the optical fiber 52 is arranged at a predetermined position relative to the illumination optics 61.

The visible light reflected by the specimen 1 passes through the objective lens 3, the dichroic mirror 64, and the half mirror 63, and is focused through the imaging lens 65. Thus, the observation image of the specimen 1 is formed on an imaging plane 67a of the camera 67 arranged on a reflected light path of the total reflection mirror 66. The camera 67 picks up the observation image and outputs the picked-up image to a display apparatus and the like not shown.

The dichroic mirror 64 reflects the visible light as illumination light and transmits the light other than the visible light. Further, the dichroic mirror 64 is retractable from above the objective lens 3 with the use of retraction driving mechanism (not shown). Therefore, when a lighting apparatus (not shown) arranged below the stage 2, for example, emits the visible light, an observation image of the specimen 1 can be observed at the eyepiece unit 9 via the lens barrel 8. Alternatively, the dichroic mirror 64 may be a half mirror. In this case, the observation image of the specimen 1 formed by the visible light can be seen both at the camera 67 and the eyepiece unit 9.

Figure 12:
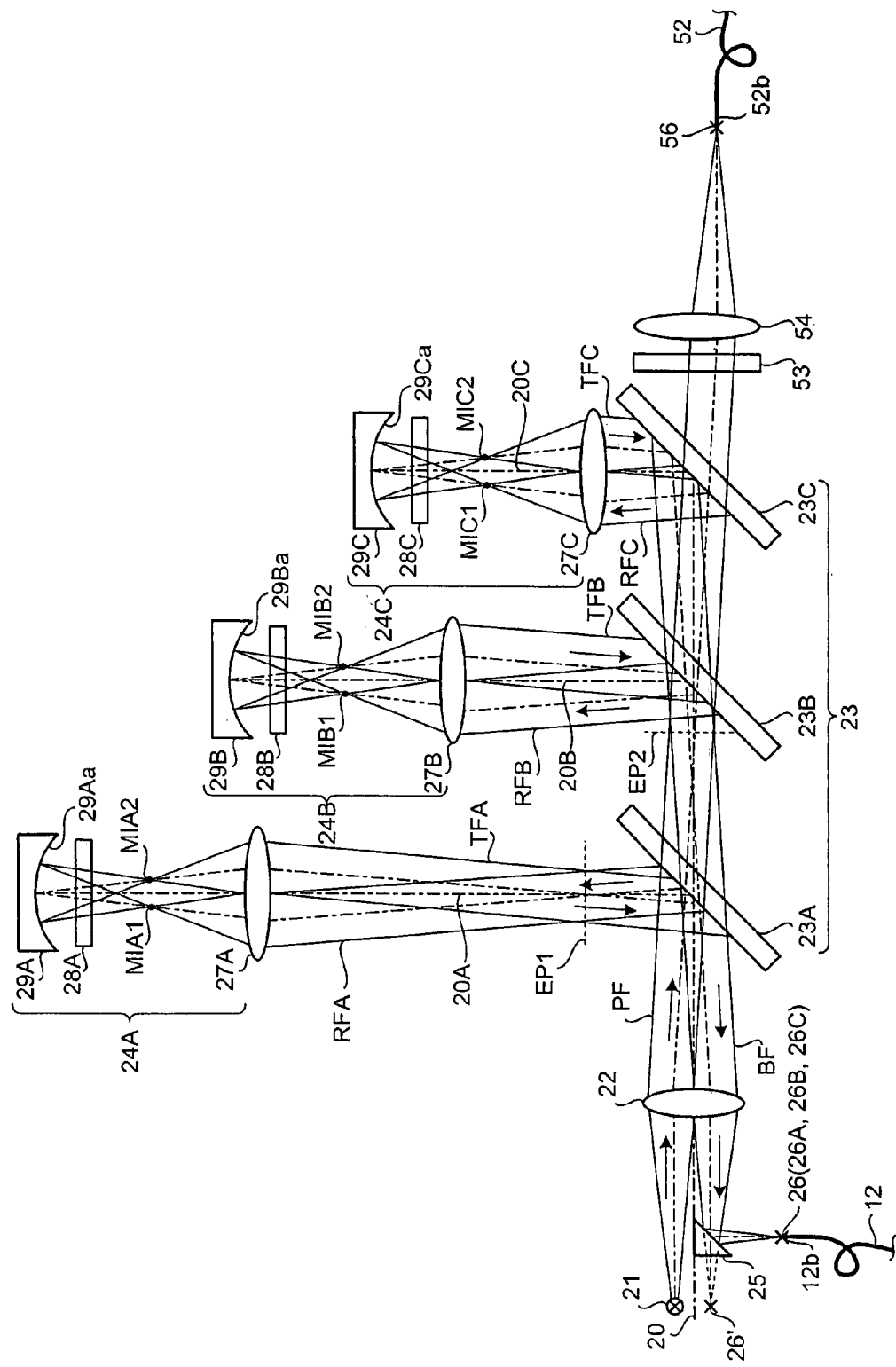
FIG. 12 is a schematic diagram of an internal structure of a wavelength-selection unit provided in a light source apparatus according to the third embodiment of the present invention.

The wavelength-selection unit 51 provided in the light source apparatus 302 will be described. FIG. 12 is a schematic diagram of an internal structure of the wavelength-selection unit 51. As shown in FIG. 12, the wavelength-selection unit 51 is based on the internal structure of the wavelength-selection unit 11, and further includes an infrared cut filter 53 and an imaging lens 54.

The infrared cut filter 53 blocks infrared light and transmits only the visible light from the light which passes through the dichroic mirrors 23A to 23C and which falls within a wavelength region not less than 385 nm. The imaging lens 54 collects visible light passing through the infrared cut filter 53, and forms a light source image 56, which serves as a supplementary light source image of the light source 21, in a telecentric manner. The light source image 56 serves as a secondary light source of the visible light passing through the infrared cut filter 53. The optical fiber 52 has an incident-end surface 52b which is arranged at a focusing position of the light source image 56. The optical fiber 52 receives the visible light emitted from the light source image 56, guides the received visible light to the illumination and imaging unit 57, and emits the light from the emission-end surface 52a attached to the illumination and imaging unit 57.

It is possible to arrange a DUV cut filter which blocks the light of 240 nm or lower wavelength region in the light path leading from the dichroic mirror 23C to the imaging lens 54. With this arrangement, the remaining light of 240 nm or lower wavelength region which is generally absorbed by a glass element or the like can be completely cut off. Further, it is possible to arrange a DUV cut filter, the infrared cut filter 53, and the like in the light path leading from the light source 21 to the collector lens 22. It is preferable, however, to arrange these elements in a portion subsequent to the dichroic mirror 23C in the light path in order to prevent the absorption of the ultraviolet light of the desired first to the third wavelength regions by base materials of the filters.

As described above, in the light source apparatus 302 according to the third embodiment, the light source image 56 of the visible light passing through the dichroic mirrors 23A to 23C is formed in addition to the light source image 26 of the ultraviolet light of the first to the third wavelength regions extracted through the dichroic mirrors 23A to 23C. Therefore, the visible light and the ultraviolet light of the first to the third wavelength regions can be emitted appropriately. Further, since the microscope body 301 is provided with the illumination and imaging unit 7 for the ultraviolet light and the illumination and imaging unit 57 for the visible light so as to allow for the illumination and the observation of the specimen 1 with the ultraviolet light and the visible light guided from the light source apparatus 302, the ultraviolet microscope apparatus 300 can realize various types of specimen observation with the use of the visible light and the ultraviolet light of the first to the third wavelength regions.

In the first to the third embodiments, the ultraviolet light of the first to the third wavelength regions are reflected once by the dichroic mirrors 23A to 23C, respectively, in the light paths extending from the collector lens 22 to the respective returning optical systems 24A to 24C and 44A to 44C. The time the ultraviolet light is reflected is not limited to once. The ultraviolet light may be reflected plural times. As an example, FIG. 13 shows a structure in which the ultraviolet light of the first wavelength region is reflected twice.

Figure 13:
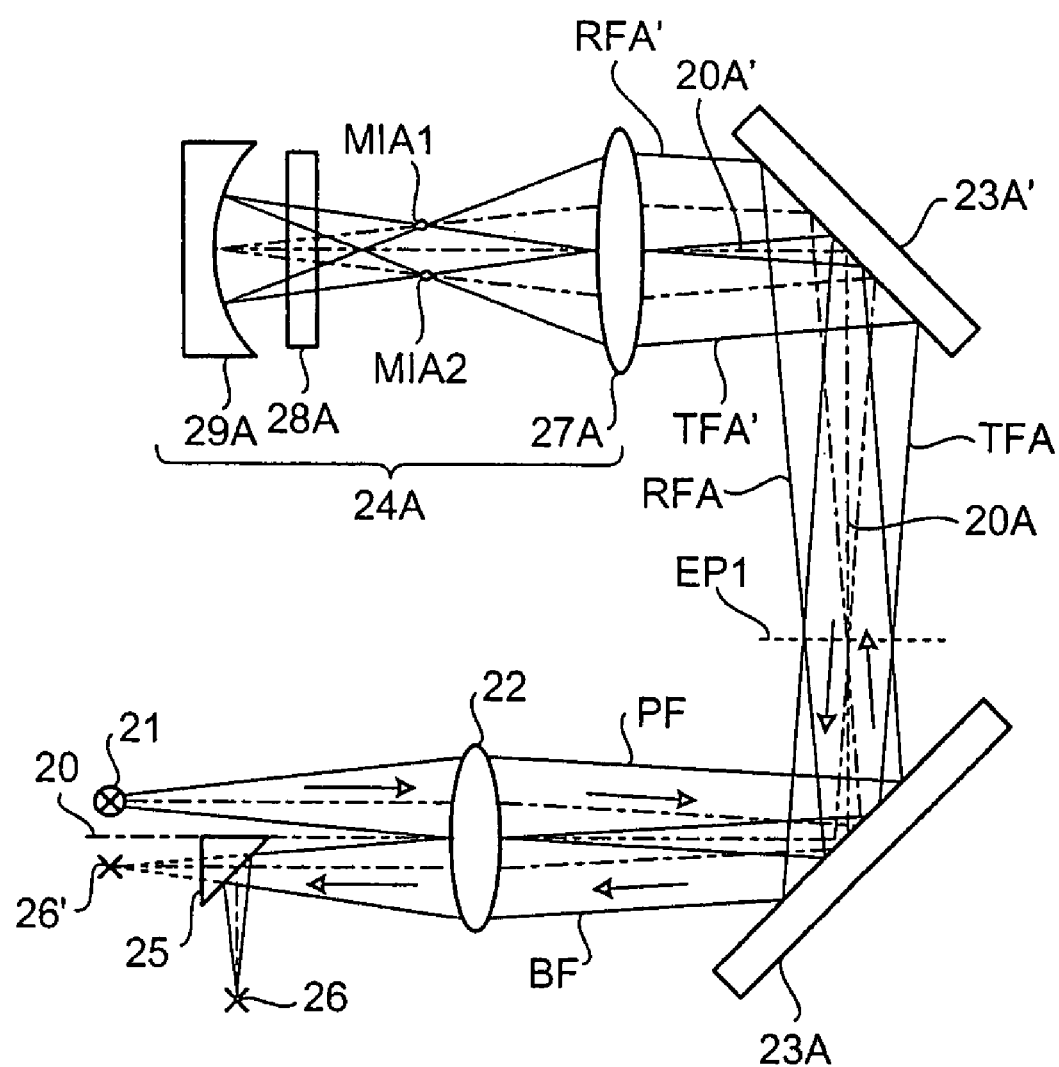
FIG. 13 shows a variation of an internal structure of the wavelength-selection unit provided in the light source apparatus according to the present invention.

The structure shown in FIG. 13 is based on the structure shown in FIG. 4, and further includes a dichroic mirror 23A' on the reflected light axis 20A of the ultraviolet light of the first wavelength region. The dichroic mirror 23A' has the same reflection characteristic as the dichroic mirror 23A, and the returning optical system 24A is arranged on the reflected light axis 20A' of the dichroic mirror 23A'. The reflected light axis 20A' corresponds to the reflection image of the reflected light axis 20A generated by the dichroic mirror 23A'.

In the above-described structure, the returning optical system 24A returns the reflected flux RFA' of the reflected flux RFA generated by the dichroic mirror 23A' symmetrically about the reflected light axis 20A', and emits as a turned flux TFA'. The turned flux TFA' is reflected again by the dichroic mirror 23A', passes through the exit pupil EP1 as the turned flux TFA, and is reflected again by the dichroic mirror 23A.

Thus, in the structure shown in FIG. 13, the light flux is reflected twice, once by each of the dichroic mirrors 23A and 23A' in the light path from the collector lens 22 to the returning optical system 24A (therefore, reflected four times while going back and forth). Therefore, the ultraviolet light of the first wavelength region can be extracted with even higher wavelength selectivity. Such a structure can be similarly adapted to the ultraviolet light of the second and the third wavelength regions.

Here, the dichroic mirrors 23A and 23A' do not need to reflect the flux within the same plane. For example, the dichroic mirror 23A' may reflect the reflected flux RFA' in a direction perpendicular to the paper surface in FIG. 13. Further, the number of reflection of the light flux by the dichroic mirror in the light path from the collector lens 22 to the returning optical system 24A is not limited to once or twice, and the flux may be reflected three times (therefore, reflected six times while the flux goes back and forth).

Further, it is possible, based on the structure of FIG. 13, to set the wavelength region of the ultraviolet light reflected by the dichroic mirror 23A' to a narrower region than the first wavelength region, arrange a returning optical system 24A on the transmitted light axis of the dichroic mirror 23A', and extract light of a segmented portion of the first wavelength region.

In the third embodiment, the visible light passing through the dichroic mirror 23C is collected by the imaging lens 54, and forms the light source image 56. At the same time, the incident-end surface 52b of the optical fiber 52 is arranged at the focusing position of the light source image 56 so as to extract the visible light. However, the visible light may be extracted immediately after the emission from the light source 21 as shown in FIG. 14, for example.

Figure 14:
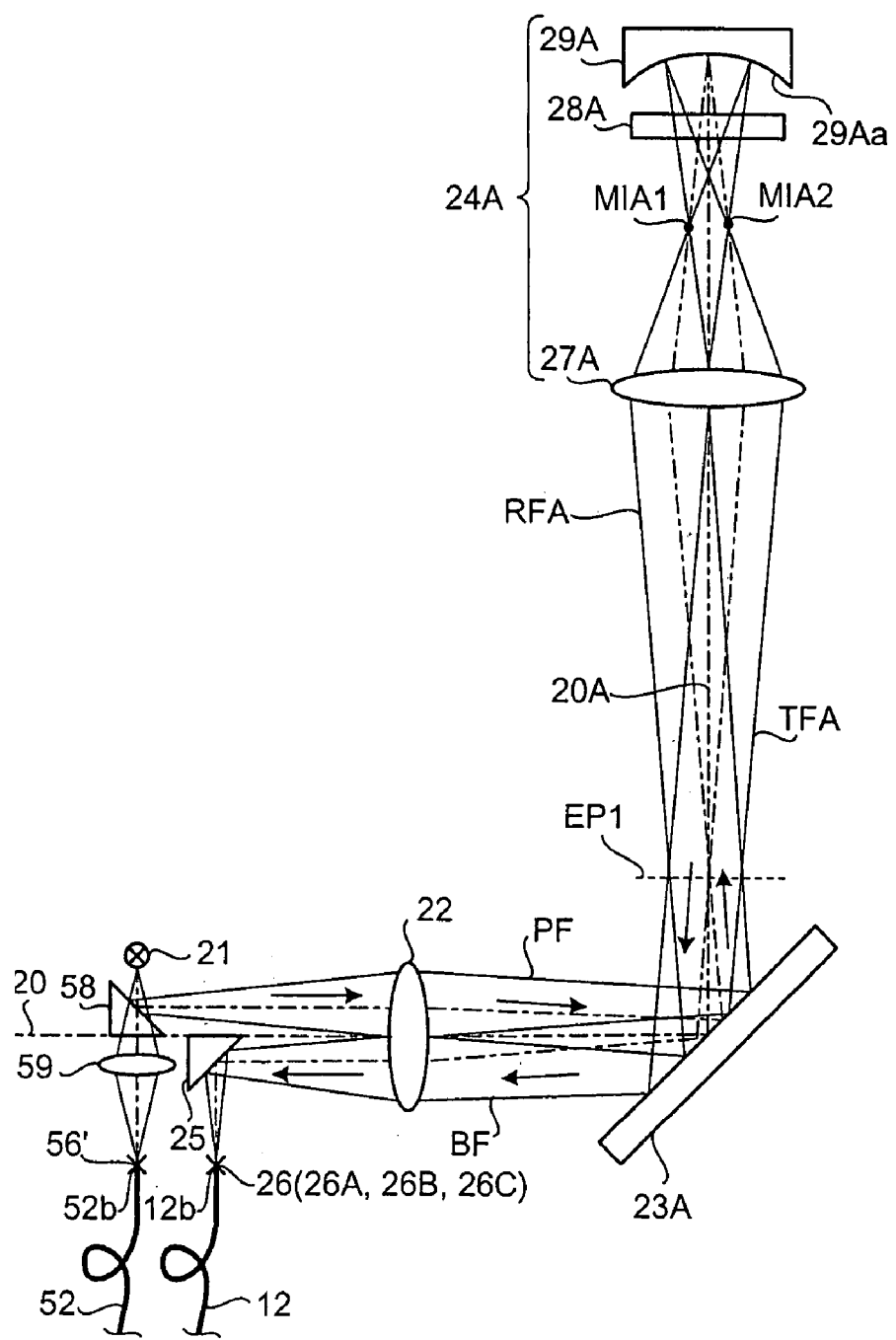
FIG. 14 shows another variation of the internal structure of the wavelength-selection unit provided in the light source apparatus according to the present invention.

The structure shown in FIG. 14 is based on the structure shown in FIG. 4, and further includes a dichroic prism 58 on the light path from the light source 21 to the collector lens 22, and an imaging lens 59 on the transmitted light path of the dichroic prism 58. In FIG. 14, a portion corresponding to the ultraviolet light of the first wavelength region alone is shown for simplicity.

The dichroic prism 58 transmits the visible light and reflects the light other than the visible light from the light emitted from the light source 21. The light reflected by the dichroic prism 58 passes through the collector lens 22 and comes into the dichroic mirror 23A as parallel flux PF. Thereafter, the ultraviolet light of the first to the third wavelength regions are extracted similarly to the first embodiment.

The visible light transmitted through the dichroic prism 58 comes into the imaging lens 59. The imaging lens 59 collects the incoming visible light and forms a light source image 56', which serves as a supplementary light source image of the light source 21, in a telecentric manner. The light source image 56' serves as a secondary light source of the visible light. The optical fiber 52 has the incident-end surface 52b which is arranged at a focusing position of the light source image 56', receives and guides the visible light emitted from the light source image 56', and emits the guided light from the emission-end surface 52a attached to the illumination and imaging unit 57.

Thus, in the structure shown in FIG. 14, the extraction of the visible light and the ultraviolet light of the first to the third wavelength regions can be achieved with a more compact structure in comparison with the structure according to the third embodiment shown in FIG. 12. Further, if a shutter is provided in the light path from the imaging lens 59 to the light source image 56', for example, light of a desired wavelength region can be extracted selectively and appropriately from the extracted visible light and ultraviolet light of the first to the third wavelength regions.

In FIG. 14, the dichroic prism 58 formed as a rectangular prism is employed. A tabular dichroic mirror may be employed instead, however. In FIG. 14, the light emitted from the light source 21 is reflected and transmitted by the dichroic prism 58 within the paper plane of the drawing. The light, however, may be reflected and transmitted in a plane perpendicular to the paper surface, for example. Then, the interference between the imaging lens 59 and the optical fiber 52 and between the total reflection mirror 25 and the optical fiber 12 attributable to their arrangement can be easily prevented.

Figure 15:
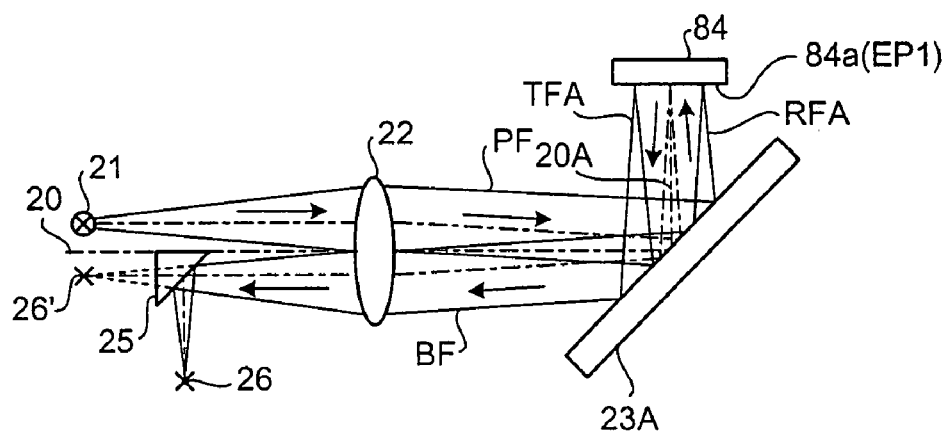
FIG. 15 shows still another variation of the internal structure of the wavelength-selection unit provided in the light source apparatus according to the present invention.

In the first to the third embodiments described above, the returning optical systems 24A to 24C and 44A to 44C are provided with imaging optical systems, and focus the corresponding light fluxes before returning. The reflected flux RFA may, however, be reflected symmetrically about the reflected light axis 20A by a flat mirror 84 having a reflecting surface 84a on the exit pupil EP1 of the collector lens 22, as shown in FIG. 15. The reflecting surface 84a does not need to be arranged precisely on the exit pupil EP1, and can be arranged anywhere near the exit pupil EP1. The structure including the flat mirror can be similarly applied to the ultraviolet light of the second and the third wavelength regions. Then, the wavelength-selection unit can be configured in a more simple and compact manner.

Figure 16:
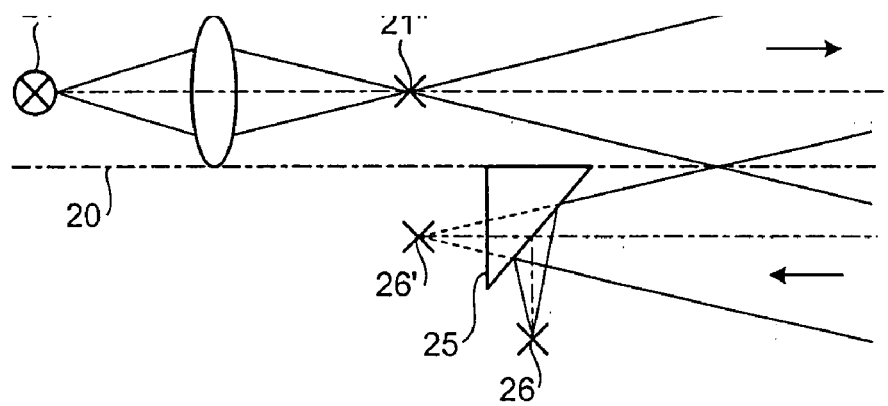
FIG. 16 shows still further variation of the internal structure of the wavelength-selection unit provided in the light source apparatus according to the present invention.

In the first to the third embodiments described above, the collector lens 22 directly collects the light emitted from the light source 21. However, as shown in FIG. 16, a primary light source image 21" of the light source 21 may be formed by a relay lens system 81, and the light emitted from the primary light source image 21" may be collected by the collector lens 22. Thus, the light source 21 which is a heat source can be separated from a casing housing the wavelength-selection unit as a whole and housed in a lamp house and the like. Then, waste heat processing and the like can be performed efficiently in the lamp house, and the light source 21 which is an expendable requiring replacement can be easily replaced with a new one.

The relay lens system 81 is shown as a single lens in FIG. 16. The relay lens system 81, however, can be configured with plural lenses or plural lens groups. Further, various filters such as a heat-absorbing filter, an infrared cut filter, and a DUV filter, and a total reflection mirror for returning the light path, a stop (such as an aperture stop) for defining effective flux from the light source 21 may be arranged in the light path from the light source 21 to the primary light source image 21". Similarly, a relay optical system for relaying and focusing the light source image 26, 56, or the like may be provided, and the light emitted from the relayed image may be received by the optical fiber 12, 52, or the like.

Further, in the first to the third embodiment described above, it is described that the total reflection mirror 25 or 41 for returning the light path is employed in the light path from the collector lens 22 to the light source image 26 or to the light source 21. The total reflection mirror 25 or 41 is employed for the convenience of arrangement of the optical fiber 12 or the light source 21, and may be removed as necessary. Further, a reflective element for returning the light path is not limited to the total reflection mirror and the total reflection prism, for example, can be employed.

In the first to the third embodiments described above, the returning optical systems 24A to 24C which use the concave mirrors and the returning optical systems 44A to 44C which use the retroreflective optical elements are described as independent embodiments. However, a single wavelength-selection unit may include the returning optical system using the concave mirror and the returning optical system using the retroreflective optical system. Specifically, the returning optical system 44C may be employed in place of the returning optical system 24C for the ultraviolet light of the third wavelength region based on the structure of the wavelength-selection unit 11, for example.

In the first to the third embodiments described above, the orientation angle of the light emitted from the light source 21 is assumed to be restricted within a predetermined range. However, it is possible to provide an aperture stop at the exit pupil EP1 or EP2 of the collector lens 22 or at a conjugate position thereof so as to define an effective orientation angle from the light source 21.

Figure 17:
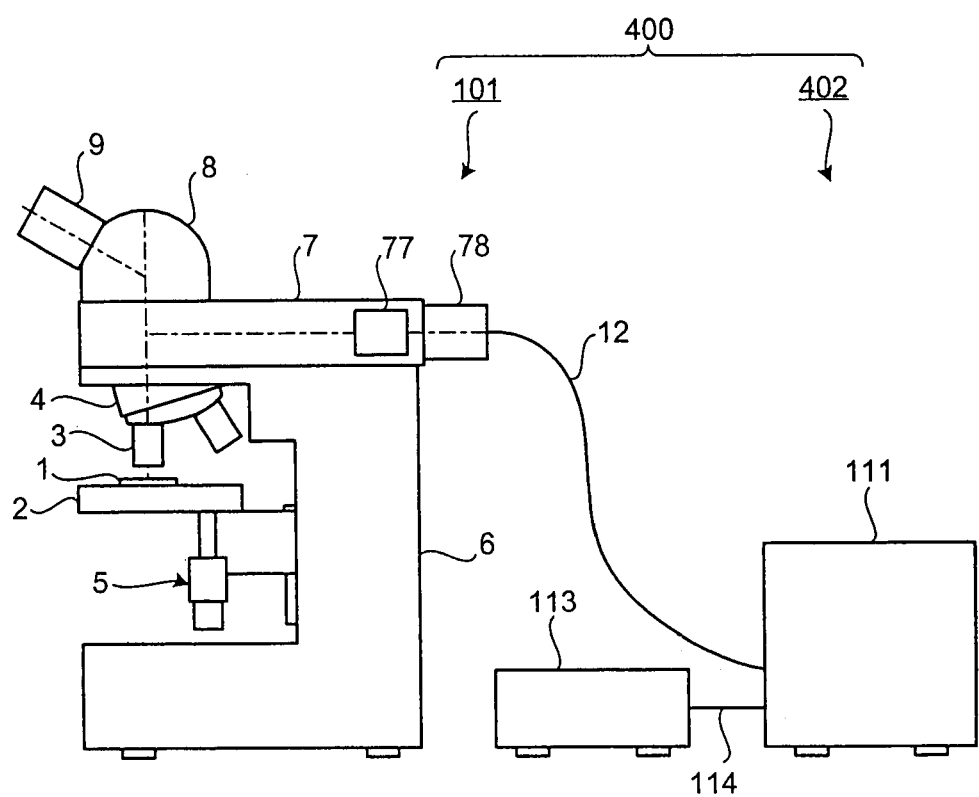
FIG. 17 is a schematic diagram of an overall structure of a microscope apparatus according to a fourth embodiment of the present invention.

A light source apparatus and a microscope apparatus according to a fourth embodiment of the present invention will be described. FIG. 17 is a schematic diagram of an overall structure of an ultraviolet microscope apparatus 400 which serves as the microscope apparatus according to the fourth embodiment. As shown in FIG. 17, the ultraviolet microscope apparatus 400 is based on the structure of the ultraviolet microscope apparatus 100 and includes a light source apparatus 402 in place of the light source apparatus 102. The light source apparatus 402 is based on the light source apparatus 102, and includes a wavelength-selection unit 111 and a control unit 113 in place of the wavelength-selection unit 11 and the control unit 13. The control unit 113 is electrically connected to the wavelength-selection unit 111 via a cable 114 and controls processing and operations of the wavelength-selection unit 111.

Figure 18:
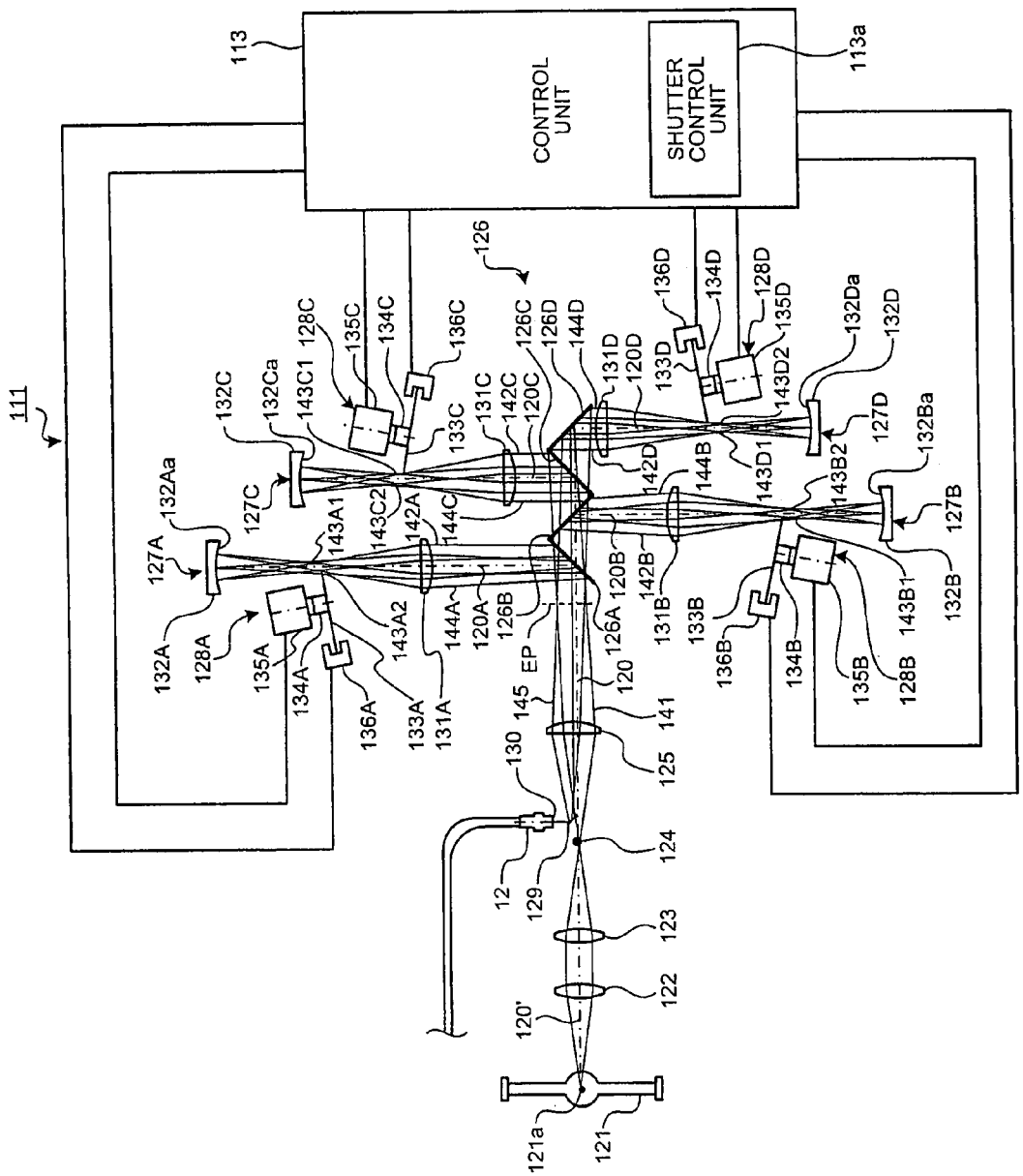
FIG. 18 is a schematic diagram of an internal structure of a wavelength-selection unit provided in a light source apparatus according to the fourth embodiment of the present invention.

The wavelength-selection unit 111 provided in the light source apparatus 402 will be described. FIG. 18 is a schematic diagram of an internal structure of the wavelength-selection unit 111. As shown in FIG. 18, the wavelength-selection unit 111 includes a lamp 121, relay lenses 122 and 123, a collector lens 125, a selective reflection optical system 126, returning optical systems 127A to 127D, shutter mechanisms 128A to 128D, and a total reflection mirror 129.

The lamp 121 is a lamp such as a mercury lamp, mercury xenon arc lamp, and metal halide lamp, which emits light including ultraviolet light ranging from a near-ultraviolet region to a deep-ultraviolet region. The relay lenses 122 and 123 relay the light emitted from a light source 121a which is a light emitting portion of the lamp 121 to form a primary light source image 124 of the light source 121a. The primary light source image 124 is formed at a position off from a light axis 120 of the collector lens 125 in a front focal plane of the collector lens 125 (in FIG. 18, the primary light source image 124 is formed at a position below the light axis 120). Light axis 120' of the relay lenses 122 and 123 is set substantially parallel to the light axis 120.

The collector lens 125 collects the light emitted from the primary light source image 124 and emits a parallel flux 141 which is inclined with respect to the light axis 120. The emitted parallel flux 141 passes through the exit pupil EP of the collector lens 125 and comes into the selective reflection optical system 126 which serves as a wavelength-selective filter. The parallel flux 141 is not limited to a flux which is parallel in a strict sense, and may be a flux which is substantially parallel. Accordingly, the focusing position of the primary light source image 124 is not limited strictly to the front focal plane of the collector lens 125, and may be anywhere near the front focal plane. Further, though the collector lens 125 is shown as a single lens in FIG. 18, the collector lens 125 can be configured with plural lenses or plural lens groups.

The selective reflection optical system 126 is configured with dichroic mirrors 126A to 126D arranged in series on the light axis 120. Each of the dichroic mirrors 126A to 126D reflects ultraviolet light of a different predetermined wavelength region from the parallel flux 141 and transmits light of wavelength regions other than the predetermined wavelength region of the reflected light. For example, the dichroic mirror 126A reflects ultraviolet light of a wavelength region of 185 nm to 240 nm (first wavelength region) and transmits the light of wavelength regions other than 185 nm to 240 nm. Further, the dichroic mirrors 126B to 126D reflect the ultraviolet light of a wavelength region of 240 nm to 290 nm (second wavelength region), the ultraviolet light of a wavelength region of 290 nm to 330 nm (third wavelength region), and the ultraviolet light of a wavelength region of 330 nm to 385 nm (fourth wavelength region), respectively, and transmit the light outside the above-specified regions. In practice, the dichroic mirrors 126A to 126D reflect the light outside the first to the fourth wavelength regions at low reflectance while reflecting the ultraviolet light of the first to the fourth wavelength regions, respectively, at high reflectance.

The returning optical systems 127A to 127D are arranged on reflected light axes 120A to 120D of the dichroic mirrors 126A to 126D, respectively, so as to receive reflected fluxes 142A to 142D of the first to the fourth wavelength regions reflected respectively by the dichroic mirrors 126A to 126D and to return and emit the received reflected fluxes 142A to 142D symmetrically about the reflected light axes 120A to 120D, respectively. The reflected light axes 120A to 120D correspond to slanted versions of the light axis 120 by the dichroic mirrors 126A to 126D, respectively.

Figure 19:
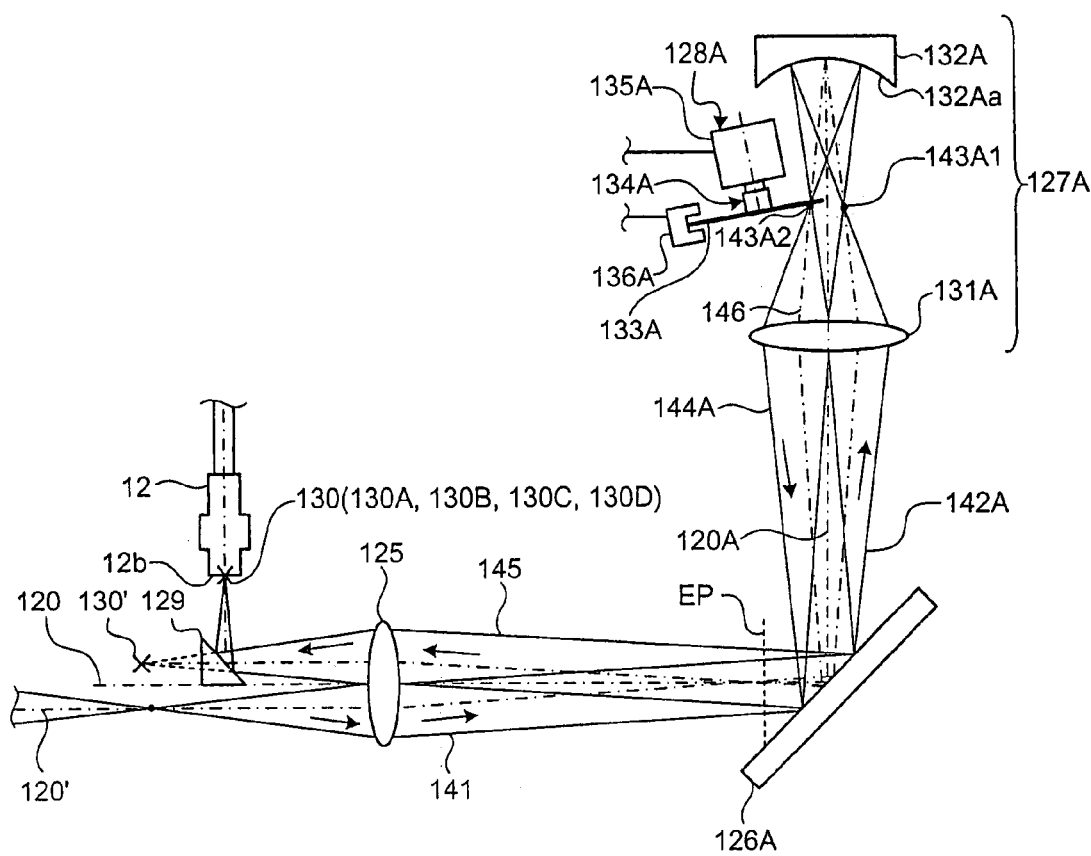
FIG. 19 is an enlarged view of a part of the structure of the wavelength-selection unit shown in FIG. 18.

The structure of each of the returning optical systems 127A to 127D will be described more specifically. FIG. 19 is an enlarged view of the structure of the returning optical system 127A. As shown in FIG. 19, the returning optical system 127A is configured as a combination of an imaging lens 131A and a concave mirror 132A. The imaging lens 131A is a lens whose aberration is corrected for the ultraviolet light of the first wavelength region and which has a predetermined focal length. The imaging lens 131A is arranged on the reflected light axis 120A away from the exit pupil EP of the collector lens 125 by the predetermined focal length along the light axis. The imaging lens 131A collects the reflected flux 142A and forms an intermediate image 143A1 which serves as a first intermediate image of the light source 121a on a back focal plane.

The concave mirror 132A has a spherical reflecting surface 132Aa having a predetermined curvature radius. The concave mirror 132A is arranged on the reflected light axis 120A away from the intermediate image 143A1 along the reflected light axis 120A by a distance equal to the curvature radius of itself. The arranged position of the concave mirror 132A corresponds to a conjugate position of the exit pupil EP of the imaging lens 131A. The concave mirror 132A collects a light flux emitted from the intermediate image 143A1 and forms an intermediate image 143A2 which is a second intermediate image at a symmetrical position of the intermediate image 143A1 about the reflected light axis 120A.

For example, when the focal length of the imaging lens 131A is 50 mm, the imaging lens 131A is arranged on the reflected light axis 120A away from the exit pupil EP at least by 50 mm. If the distance between the imaging lens 131A and the exit pupil EP is 100 mm, the conjugate position of the exit pupil EP with respect to the imaging lens 131A is a position 100 mm away from the imaging lens 131A. The concave mirror 132A is arranged at this conjugate position. Then, the intermediate image 143A1 is formed at a position 50 mm away from the imaging lens 131A. Therefore, the curvature radius of the concave mirror 132A is set to 50 mm (=100−50) which is equal to the distance from the intermediate image 143A1. The intermediate image 143A2 is formed at a symmetrical position of the intermediate image 143A1 about the reflected light axis 120A 50 mm away from the imaging lens 131A.

In the returning optical system 127A configured as described above, the imaging lens 131A collects the light flux emitted from the intermediate image 143A2 and emits a turned flux 144A as a parallel flux which is symmetrical with the reflected flux 142A about the reflected light axis 120A.

The returning optical systems 127B to 127D are configured as combinations of imaging lenses 131B to 131D and concave mirrors 132B to 132D, respectively, similarly to the returning optical system 127A. Specifically, the imaging lenses 131B to 131D are lenses whose aberration are corrected for the ultraviolet light of the second to the fourth wavelength regions, respectively, and have a predetermined focal length. The imaging lenses 131B to 131D are arranged on the reflected light axes 120B to 120D at positions away from the exit pupil EP of the collector lens 125 along the respective light axes at least by the predetermined focal lengths thereof. The imaging lenses 131B to 131D collect the reflected fluxes 142B to 142D, respectively, and form intermediate images 143B1, 143C1, and 143D1 which serve as the first intermediate image of the light source 121a on the back focal planes, respectively.

The concave mirrors 132B to 132D have spherical reflecting surfaces 132Ba, 132Ca, 132Da, respectively, each having a predetermined curvature radius. The concave mirrors 132B to 132D are arranged on the reflected light axes 120B to 120D, respectively, away from the intermediate images 143B1, 143C1, 143D1, respectively, along the reflected light axes 120B to 120D by a distance equal to the curvature radius of itself. The concave mirrors 132B to 132D collect light fluxes emitted from the intermediate images 143B1, 143C1, 143D1 and form intermediate images 143B2, 143C2, 143D2 which are second intermediate images at symmetrical positions of the intermediate images 143B1, 143C1, 143D1 about the reflected light axes 120B to 120D.

The imaging lenses 131B to 131D collect the light fluxes emitted from the intermediate images 143B2, 143C2, 143D2, respectively, and emit turned fluxes 144B to 144D as parallel fluxes which are symmetrical with the reflected fluxes 142B to 142D about the reflected light axes 120B to 120D, respectively.

When the imaging lenses 131A to 131D are of the same specification whose aberration are well corrected for the ultraviolet light of the first to the fourth wavelength regions, the returning optical systems 127A to 127D are arranged so that the light path lengths between the collector lens 125 and the returning optical systems 127A to 127D are equal to each other. In other words, the returning optical systems 127A to 127D are arranged so that the length of the light path from the exit pupil EP to the imaging lens 131A and the length of the light path from the exit pupil EP to each of the imaging lenses 131B to 131D are equal to each other.

Further, the concave mirrors 132A to 132D employed in the returning optical systems 127A to 127D are not limited to the spherical mirrors. Any reflective imaging element such as a parabolic mirror may be employed as far as the reflective imaging element can form the intermediate image 143A2, 143B2, 143C2, and 143D2 as described above. Further, each of the concave mirrors 132A to 132D is not limited to a single reflective imaging element, and may be configured as an imaging optical system including optional numbers of optical elements. Though shown as a single lens in FIG. 18, each of the imaging lenses 131A to 131D can be configured with plural lenses or plural lens groups.

Thus, the turned fluxes 144A to 144D emitted from the returning optical systems 127A to 127D are reflected by the dichroic mirrors 126A to 126D again, respectively. As a result, the ultraviolet light of the first to the fourth wavelength regions included in the parallel flux 141 are selectively reflected twice by the dichroic mirrors 126A to 126D while going back and forth, whereby the ultraviolet light is extracted with high wavelength selectivity.

The re-reflected fluxes from the dichroic mirrors 126A to 126D are combined in a coaxial manner. The combined flux is a back flux 145, and passes through the exit pupil EP symmetrically with the parallel flux 141 about the light axis 120 in a reverse direction, and is collected by the collector lens 125. The collector lens 125 has aberration well corrected for the ultraviolet light of the first to the fourth wavelength regions. The collector lens 125 converges the ultraviolet light of the first to the fourth wavelength regions in the back flux 145 to the identical position through the total reflection mirror 129, and forms light source images 130A to 130D (see FIG. 19) in a telecentric manner. The light source images 130A to 130D are secondary light sources of the ultraviolet light of the first to the fourth wavelength regions, respectively.

The collector lens 125 converges the back flux 145 on a symmetrical position of the primary light source image 124 about the light axis 120 thereby forming a light source image 130', if the back flux does not pass through the total reflection mirror 129 as shown in FIG. 19. The arranged position of the total reflection mirror 129 can be any position on the light path between the light source image 130' and the collector lens 125, as far as the image-forming flux of the light source image 130' and the effective light flux of the primary light source image 124 do not interfere with each other spatially.

A light source image 130 which is an integrated light source image of the light source images 130A to 130D serves as a secondary light source which selectively emits the ultraviolet light of the first to the fourth wavelength regions according to blocking/opening operations of the light paths by the shutter mechanisms 128A to 128D provided respectively for the returning optical systems 127A to 127D. Specifically, the light source image 130 serves as the secondary light source which emits the ultraviolet light of the wavelength region corresponding to an opened shutter mechanism among the shutter mechanisms 128A to 128D and which emits optional combination of ultraviolet light of the first to the fourth wavelength regions.

The optical fiber 12 has the incident-end surface 12b which is arranged at the focusing position of the light source image 130. The optical fiber 12 receives the ultraviolet light emitted from the light source image 130 from the incident-end surface 12b and emits the received light from the emission-end surface 12a attached to the illumination and imaging unit 7. Thus, the light source apparatus 402 according to the fourth embodiment can emit any combination of the ultraviolet light of the first to the fourth wavelength regions from the emission-end surface 12a.

Figure 20A:
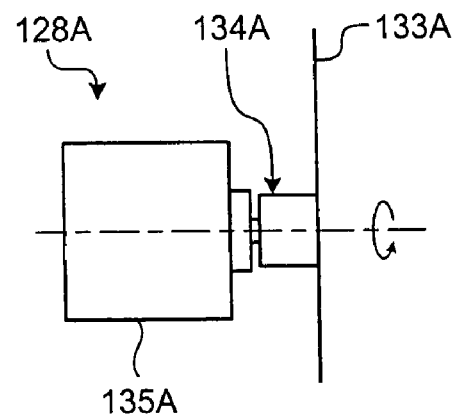
FIG. 20A is a diagram of a structure of a shutter mechanism provided in the wavelength-selection unit shown in FIG. 18.
Figure 20B:
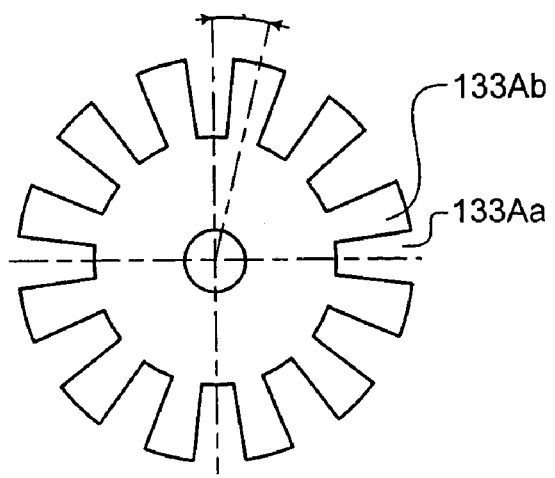
FIG. 20B is a diagram of the structure of the shutter mechanism provided in the wavelength-selection unit shown in FIG. 18.

The shutter mechanisms 128A to 128D will be described specifically. FIGS. 20A and 20B are diagrams showing the structure of the shutter mechanism 128A. FIG. 20A shows a side surface of the shutter mechanism 128A, and FIG. 20B shows a front surface (right side surface in FIG. 20A). As shown in FIG. 20A, the shutter mechanism 128A includes a pulse motor 135A which rotationally drives around a rotation shaft 134A, and a disk-like light path blocking member 133A which is connected to the rotation shaft 134A at the center and is rotated in a circumferential direction according to the rotational drive of the pulse motor 135A.

The light path blocking member 133A has plural apertures 133Aa formed like gear teeth at predetermined central intervals in a circumferential direction, and blocking portions 133Ab which are portions between the apertures 133Aa, as shown in FIG. 20B. The light path blocking member 133A is formed by pressing a circular plate, for example. Alternatively, the light path blocking member 133A is formed by laser cutting according to which the member is cut out from the base by laser beams, or by etching. The material, thickness, and the like of the base are selected as appropriate in consideration of the workability of the light path blocking member 133A, drivability of the pulse motor 135A, and the like.

In the light path blocking member 133A, a central angle corresponding to the central interval between the apertures 133Aa is set equal to a rotation angle of the rotation shaft 134A caused by the rotational drive of the pulse motor 135A for two pulses. In other words, the central angle $\phi$ corresponding to the central interval between the aperture 133Aa and the blocking portion 133Ab is set equal to the rotation angle of the rotation shaft 134A corresponding to one-pulse rotation by the pulse motor 135A.

The pulse motor 135A is electrically connected to the control unit 113, and rotationally drives the rotation shaft 134A and the light path blocking member 133A based on the command from a shutter control unit 113a (see FIG. 18) provided in the control unit 113. Specifically, the pulse motor 135A rotates the light path blocking member 133A in the circumferential direction according to pulse signals supplied from the shutter control unit 113a. For example, when the pulse motor 135A receives a one-pulse pulse signal from the shutter control unit 113a, the pulse motor 135A rotates the light path blocking member 133A by the central angle $\phi$ so that the aperture 133Aa and the blocking portion 133Ab switch positions. The pulse motor 135A can rotate the light path blocking member 133A continuously or intermittently according to the pulse signals from the shutter control unit 113a.

The shutter mechanism 128A configured as described above is arranged adjacent to the returning optical system 127A as shown in FIG. 19. Specifically, the shutter mechanism 128A is arranged so that an edge portion of the light path blocking member 133A is placed on the light path near the intermediate image 143A2. Thus, the shutter mechanism 128A can selectively block and open the light path of the returning optical system 127A by rotating the light path blocking member 133A in the circumferential direction thereof according to the rotational driving of the pulse motor 135A, and sequentially inserting and retracting the blocking portion 133Ab and the aperture 133Aa into and from the light path near the intermediate image 143A2.

The shutter mechanism 128A is arranged in such a manner that the light path blocking member 133A is inclined at a predetermined angle from a principal ray 146 of an image-forming light flux which forms the intermediate image 143A2. Therefore, when the light path of the returning optical system 127A is blocked, light reflected by the surface of the blocking portion 133Ab does not return to the dichroic mirror 126A via the concave mirror 132A and the imaging lens 131A. Hence, there is no need to perform special processing, for example, providing an antireflection coating on the surface of the blocking member 133Ab.

Further, since the shutter mechanism 128A is arranged so that the edge portion of the light path blocking member 133A comes on the light path near the intermediate image 143A2, manufacturing is possible in small size and at low cost. Since the aperture 133Aa and the blocking portion 133Ab are inserted into and retracted from the light path near the intermediate image 143A2 where the light flux becomes narrowest in the light path of the returning optical system 127A, a required diameter (effective diameter) thereof can be made smaller compared with a case where these portions are inserted into and retracted from the light path at other position. Thus, the overall diameter of the light path blocking member 133A can be made small and the driving power of the pulse motor 135A can be minimized and the pulse motor 135 can be downsized.

In the above, it is described that the edge portion of the light path blocking member 133A is placed on the light path near the intermediate image 143A2. However, the edge portion may be placed on the light path near the intermediate image 143A1. Further, the edge portion of the light path blocking member 133A may be arranged on the light path so as to cross over the portion near the intermediate image 143A1 and the portion near the intermediate image 143A2. Alternatively, the edge portion may be arranged on the light path at portions other than the portions near the intermediate images 143A1 and 143A2. It is preferable, however, to arrange the edge portion on the light path near the intermediate image 143A1 or the intermediate image 143A2 in view of downsizing of the shutter mechanism 128A, for example.

A blocking detection sensor 136A is arranged near the shutter mechanism 128A so as to detect whether the shutter mechanism 128A blocks the light path of the returning optical system 127A or not. The blocking detection sensor 136A is electrically connected to the control unit 113, and outputs a detection result to the shutter control unit 113a. The shutter control unit 113a can securely control the blocking and opening operations of the light path by the shutter mechanism 128A based on the detection result.

The blocking detection sensor 136A is, for example, realized with a photo interrupter which is arranged so as to sandwich the edge portion of the light path blocking member 133A at a predetermined detection position not on the light path of the returning optical system 127A. Here, the blocking detection sensor 136A can detect whether the light path blocking member 133A blocks the light path of the returning optical system 127A or not by detecting whether the aperture 133Aa or the blocking portion 133Ab is present or not.

The shutter mechanisms 128B to 128D are configured similarly to the shutter mechanism 128A, and include light path blocking members 133B to 133D, rotation shafts 134B to 134D, and pulse motors 135B to 135D, respectively. Specifically, the light path blocking members 133B to 133D are formed similarly to the light path blocking member 133A, and rotated by the pulse motors 135B to 135D via the rotation shafts 134B to 134D, respectively. The pulse motors 135B to 135D are each electrically connected to the control unit 113, and rotate the light path blocking members 133B to 133D in circumferential direction according to the pulse signals supplied from the shutter control unit 113a.

The shutter mechanisms 128B to 128D are arranged near the returning optical systems 127B to 127D, respectively. Each of the edge portions of the light path blocking members 133B to 133D is arranged on the light path near the intermediate image of the light source 121a formed in the corresponding one of the returning optical systems 127B to 127D. Thus, the shutter mechanisms 128B to 128D can selectively block and open the light paths of the corresponding returning optical systems 127B to 127D. In the example shown in FIG. 18, the light path blocking members 133B to 133D are arranged on the light paths near the intermediate images 143B1, 143C1, 143D2, respectively. However, the light path blocking members 133B to 133D may be arranged on the light paths near the other intermediate images 143B2, 143C2, 143D1.

Further, the shutter mechanisms 128B to 128D are arranged so that each of the light path blocking members 133B to 133D is inclined by a predetermined angle with respect to a principal ray of the image-forming light flux forming the intermediate image near the light path which is to be blocked. Therefore, when the light paths are blocked, the light reflected by the surfaces of the corresponding light path blocking members 133B to 133D do not return to the corresponding dichroic mirrors 126B to 126D. Hence, there is no need to perform special processing, for example, providing an antireflection coating on the surfaces of the light path blocking members 133B to 133D.

Blocking detection sensors 136B to 136D are arranged near the shutter mechanisms 128B to 128D, respectively, so as to detect whether the corresponding shutter mechanisms 128B to 128D block the light paths of the returning optical systems 127B to 127D, respectively. Each of the blocking detection sensors 136B to 136D is electrically connected to the control unit 113 and outputs a detection result to the shutter control unit 113a. The shutter control unit 113a can securely control the blocking and opening operations of the light paths by the corresponding shutter mechanisms 128B to 128D based on the detection results. The blocking detection sensors 136B to 136D are configured similarly to the blocking detection sensor 136A.

The shutter control unit 113a as a whole acquires the detection results from the blocking detection sensors 136A to 136D and comprehensively controls the blocking and opening/closing operations of the light paths of the returning optical systems 127A to 127D by the shutter mechanisms 128A to 128D. Specifically, the shutter control unit 113a controls the shutter mechanisms 128A to 128D to block and open the light paths of the returning optical systems 127A to 127D appropriately based on the detection results from the blocking detection sensors 136A to 136D, so that optional combination of the ultraviolet light of the first to the fourth wavelength regions can be emitted from the light source image 130.

For example, only one of the light paths of the returning optical systems 127A to 127D may be opened so that the ultraviolet light of one of the first to the fourth wavelength regions is selectively emitted. Alternatively, it is possible to sequentially open one of the light paths of the returning optical systems 127A to 127D, so that the ultraviolet light of the first to the fourth wavelength regions are sequentially and selectively emitted. The order the light paths are opened can be changed as appropriate. Further, it is possible to open optional numbers of the light paths of the returning optical systems 127A to 127D so that appropriate combination of the ultraviolet light of the first to the fourth wavelength regions is emitted.

As described above, the light source apparatus 402 according to the fourth embodiment includes the collector lens 125 which collects the light emitted from the light source 121a and emits the parallel flux 141 which is inclined with respect to the light axis 120, the selective reflection optical system 126 which is configured with the dichroic mirrors 126A to 126D which reflect the ultraviolet light of the first to the fourth wavelength regions in the parallel flux 141 selectively, the returning optical systems 127A to 127D which return and emit the reflected fluxes 142A to 142D, which are reflected by the selective reflection optical system 126, symmetrically about the corresponding reflected light axes 120A to 120D, and the shutter mechanisms 128A to 128D which block and open the light paths of the returning optical systems 127A to 127D selectively. The selective reflection optical system 126 re-reflects the turned fluxes 144A to 144D emitted from the returning optical systems 127A to 127D, and the collector lens 125 collects the back flux 145 which is a re-reflected flux re-reflected by the selective reflection optical system 126 and forms the light source image 130 of the light source 121a. Therefore, different from the case where the half mirror is placed in the light path, the ultraviolet light of the first to the fourth wavelength regions can be extracted without decrease in light intensity. At the same time, the light source images 130A to 130D which serve as the secondary light sources of the ultraviolet light of the respective wavelength regions can be formed in a telecentric manner so that the orientational characteristic of the light source 121a is maintained.

Further, in the light source apparatus 402, the returning optical systems 127A to 127D have the shutter mechanisms 128A to 128D, respectively, and the shutter control unit 113a can comprehensively control the blocking and opening/closing operations of the light paths of the returning optical systems 127A to 127D by the shutter mechanisms 128A to 128D. Therefore, optional combination of ultraviolet light of the first to the fourth wavelength regions can be emitted.

Further, in the light source apparatus 402, each of the shutter mechanisms 128A to 128D blocks and opens the light path near the intermediate image where the light flux becomes narrowest in the light paths of the returning optical systems 127A to 127D. Therefore, the shutter mechanisms 128A to 128D can be manufacture in small size and at low cost.

Further, in the light source apparatus 402, the shutter mechanisms 128A to 128D rotate the light path blocking members 133A to 133D, respectively, by the central angle φ for every one-pulse pulse signal supplied from the shutter control unit 113a, so as to switch between blocking and opening of the light paths. Therefore, the blocking and opening operations can be performed at high speed, and the rotational driving of the light path blocking members 133A to 133D can be achieved while the rotation can be stopped with high stability. At the same time the rotation control by the shutter control unit 113a can be readily realized.

The central angle φ, which is the rotation angle of the light path blocking members 133A to 133D for switching between the blocking and the opening of the light path is not limited to the rotation angle corresponding to one pulse, and may be the rotation angle corresponding to two or more pulses. Thus, the switching speed between the blocking and opening of the light path can be changed as appropriate. In this case, it is preferable that the central angle φ be a rotation angle corresponding to an integer number of pulses in view of stable stopping of rotation, controllability of rotational driving of the light path blocking members 133A to 133D, and the like. However, when the micro-step driving is utilized, according to which the rotation angle corresponding to one pulse is divided so as to increase the rotational resolution power of the pulse motor and perform trapezoidal control based on the divided pulse, the central angle φ does not need to be set as described above, and the rotation can be yet stably stopped.

Further, in the light source apparatus 402, the returning optical systems 127A to 127D may be added after a total reflection mirror or the like are arranged in each of the light paths leading from the dichroic mirrors 126A to 126D to the imaging lenses 131A to 131D so as to make the light paths properly returned. In this case, the wavelength-selection unit 111 as a whole can be configured in a compact manner.

Further, since there is no need to arrange an optical element in a position where the ultraviolet light is converged and the energy is concentrated in the optical system provided in the wavelength-selection unit 111 of the light source apparatus 402, the damage on each optical element caused by the ultraviolet light can be generally reduced, and the long life of the elements can be realized. Still further, since there is no need to converge the ultraviolet light on the surface of each optical element, the decrease in light intensity attributable to the light scattering caused by the dust attached to the surface or the scratches can be reduced.

In the fourth embodiment described above, the ultraviolet light of the first to the fourth wavelength regions are reflected by the dichroic mirrors 126A to 126D in the light paths leading from the collector lens 125 to the returning optical systems 127A to 127D only once. However, the ultraviolet light may be reflected twice or more. Then, the ultraviolet light of the respective wavelength regions can be reflected four times or more in total while the light is going back and forth, whereby the ultraviolet light of the first to the fourth wavelength regions can be extracted with even higher wavelength selectivity.

Further, in the fourth embodiment described above, the dichroic mirrors 126A to 126D reflect the parallel flux 141 within the same plane (within the paper plane of FIG. 18). Alternatively, however, the dichroic mirrors 126A to 126D may reflect the light in different directions from each other. For example, the direction of reflection of some dichroic mirrors may be orthogonal to the direction of reflection of other dichroic mirrors.

Further, in the fourth embodiment described above, the collector lens 125 collects the light emitted from the light source 121a via the primary light source image 124. Alternatively, it is possible to arrange the light source 121a at the position of the primary light source image 124 and directly collect the light emitted from the light source 121a. When the primary light source image 124 of the light source 121a is formed through the relay lenses 122 and 123, and the light source 121a is separated from the collector lens 125 as in the fourth embodiment described above, the lamp 121 which is a heat source can be separated from the casing which houses the wavelength-selection unit as a whole, and housed in a lamp house or the like. In this case, the waste heat processing can be performed efficiently in the lamp house, and the lamp 121 which is an expendable that requires replacement can be easily replaced with a new one.

Further, in the fourth embodiment described above, it is described that the total reflection mirror 129 for returning the light path is employed in the light path between the collector lens 125 and the light source image 130. The total reflection mirror 129, however, is employed for the convenience of arrangement of the optical fiber 12 or the like, and can be removed as necessary. On the contrary, the total reflection mirror for returning the light path can be arranged in the light path between the light source 121a and the collector lens 125. Such a reflective element for returning the light path is not limited to the total reflection mirror, and can be a total reflection prism or the like.

Further, in the fourth embodiment described above, it is described that the orientational angle of the light emitted from the light source 121a is restricted to a predetermined range. However, it is possible to provide an aperture stop in the exit pupil of the relay lens 122 (or the exit pupil of relay lens 123) or the exit pupil EP of the collector lens 125 so as to define an effective orientational angle from the light source 121a.

It is described that the ultraviolet light of the first to the third wavelength regions is extracted in each of the wavelength-selection units 11, 31, and 51 in the first to the third embodiments, and that the light source apparatus 402 extracts the ultraviolet light of the first to the fourth wavelength regions in the fourth embodiment. The number of wavelength regions of the extracted ultraviolet light does not need to be limited to three or four. The ultraviolet light of two or less or five or more wavelength regions may be extracted. Further, the extracted light does not need to be limited to the ultraviolet light. Visible light or infrared light of optional wavelength regions may be extracted.

Further, it is described that the collector lens 22 is employed as a light-collecting optical system which collects the light emitted from the light source 21 and emits the parallel flux PF in the first to the third embodiment, and that the collector lens 125 is employed as a light-collecting optical system which collects the light emitted from the light source 121a and emits the parallel flux 141 in the fourth embodiment. However, the light-collecting optical system is not limited to a lens system (refracting system), and can be a reflecting system which includes a parabolic mirror and the like, for example. Alternatively, the light-collecting optical system can be a reflecting-and-refracting system including both the lens system and the reflection imaging system.

Further, it is described that the main microscope bodies 101 and 301 in the first to the fourth embodiments are erecting microscopes in which the illumination is directed from above the specimen, and the observation is performed from above the specimen. The microscope body, however, can be an inverted microscope, in which the illumination and observation is performed from below the specimen.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A light source apparatus comprising:
   a light source which emits broadband light;
   a light-collecting optical system which collects light emitted from the light source and emits a parallel flux which is inclined relative to a light axis of the light-collecting optical system;
   a selective reflection optical system which reflects light of a predetermined wavelength region selectively from the parallel flux; and
   a returning optical system which returns a light flux reflected by the selective reflection optical system symmetrically about a reflected light axis of the selective reflection optical system,
   wherein the light-collecting optical system collects a light flux which is returned by the returning optical system and re-reflected by the selective reflection optical system, and forms a light source image of the light source.

2. The light source apparatus according to claim 1, wherein the selective reflection optical system reflects the light of the predetermined wavelength region in the parallel flux plural times.

3. The light source apparatus according to claim 1, wherein the predetermined wavelength region includes a plurality of wavelength regions,
   the selective reflection optical system includes plural selective reflection elements each reflecting the light of a different wavelength region in the parallel flux and transmitting light of wavelength regions other than the wavelength region of the light to be reflected, and the returning optical system includes a plurality of returning optical systems which are arranged respectively on reflected light axes of the selective reflection elements, each of the returning optical systems returning the reflected flux reflected by the selective reflection element symmetrically about the reflected light axis.

4. The light source apparatus according to claim 3, wherein each of the returning optical systems is arranged on the reflected optical axis of the corresponding selective reflection element so that a length of a light path from the light-collecting optical system to the returning optical system is equal.

5. The light source apparatus according to claim 1, wherein,
the returning optical system includes
an imaging lens which has a predetermined focal length, which is arranged on the reflected light axis away from an exit pupil of the light-collecting optical system at least by the focal length, and which collects the reflected flux to form a first intermediate image of the light source, and
a concave mirror which collects a light flux from the first intermediate image and forms a second intermediate image at a symmetrical position of the first intermediate image about the reflected light axis,
wherein the imaging lens collects a light flux from the second intermediate image and emits a parallel flux which is symmetrical with the reflected flux about the reflected light axis.

6. The light source apparatus according to claim 5, wherein the concave mirror has a predetermined curvature radius and is arranged on the reflected light axis away from the first intermediate image in a direction of the reflected light axis by a distance equal to the curvature radius.

7. The light source apparatus according to claim 1, wherein the returning optical system includes
an imaging lens which collects the reflected flux and forms an intermediate image of the light source in a telecentric manner, and
a retroreflective element which retroreflects an image-forming flux formed by the imaging lens symmetrically about the reflected light axis, and forms the intermediate image inside the retroreflective element itself on a plane including the reflected light axis,
wherein the imaging lens collects a light flux retroreflected by the retroreflective element and emits a parallel flux symmetrically with the reflected flux about the reflected light axis.

8. The light source apparatus according to claim 1, wherein the returning optical system is a flat mirror which is arranged at a position of an exit pupil of the light-collecting optical system, and which returns the reflected flux symmetrically about the reflected light axis.

9. The light source apparatus according to claim 1, further comprising
a relay optical system which collects the light emitted from the light source and forms a primary light source image of the light source,
wherein the light-collecting optical system collects light from the primary light source image and emits a parallel flux which is inclined relative to the light axis of the light-collecting optical system.

10. The light source apparatus according to claim 1, further comprising
a shutter mechanism which performs blocking and opening of a light path of the returning optical system selectively.

11. The light source apparatus according to claim 3, further comprising
a plurality of shutter mechanisms which are provided for the returning optical systems, respectively, each of the shutter mechanisms performing blocking and opening of a light path of the returning optical system selectively.

12. The light source apparatus according to claim 5, further comprising
a shutter mechanism which performs blocking and opening of at least one light path near the first intermediate image or near the second intermediate image selectively.

13. The light source apparatus according to claim 10, further comprising
a shutter control unit which controls blocking and opening operations of the light path by the shutter mechanism.

14. The light source apparatus according to claim 13, wherein
the shutter mechanism includes
a pulse motor which rotates a rotation shaft,
a blocking member which is connected to the rotation shaft and which performs blocking and opening of the light path of the returning optical system according to a rotation of the rotation shaft,
wherein the shutter control unit controls the blocking and opening operations of the light path by the blocking member by supplying a pulse signal to the pulse motor.

15. The light source apparatus according to claim 14, wherein
the blocking member is a disk-like member which has plural apertures formed at predetermined intervals in a circumferential direction, which has a central portion connected to the rotation shaft, and which is rotated in the circumferential direction according to a rotation of the rotation shaft.

16. The light source apparatus according to claim 15, wherein
a central angle corresponding to the predetermined interval is equal to a rotation angle of the rotation shaft corresponding to an amount of rotation corresponding to even pulses of the pulse motor.

17. The light source apparatus according to claim 13, further comprising
a blocking detector which detects whether the shutter mechanism blocks the light path of the returning optical system,
wherein the shutter control unit controls the blocking and opening operations of the light path by the shutter mechanism based on a detection result of the blocking detector.

18. A microscope apparatus comprising:
a light source apparatus including
a light source which emits broadband light,
a light-collecting optical system which collects light emitted from the light source and emits a parallel flux which is inclined relative to a light axis of the light-collecting optical system,
a selective reflection optical system which reflects light of a predetermined wavelength region selectively from the parallel flux, and
a returning optical system which returns a light flux reflected by the selective reflection optical system symmetrically about a reflected light axis of the selective reflection optical system,
wherein the light-collecting optical system collects a light flux which is returned by the returning optical system and re-reflected by the selective reflection optical system, and forms a light source image of the light source.

* * * * *